United States Patent
Welker et al.

(10) Patent No.: US 10,019,131 B2
(45) Date of Patent: Jul. 10, 2018

(54) TWO-HANDED OBJECT MANIPULATIONS IN VIRTUAL REALITY

(71) Applicant: Google Inc., Mountain View, CA (US)

(72) Inventors: Stefan Welker, Mountain View, CA (US); Manuel Christian Clement, Felton, CA (US)

(73) Assignee: Google LLC, Mountain View, CA (US)

( * ) Notice: Subject to any disclaimer, the term of this patent is extended or adjusted under 35 U.S.C. 154(b) by 20 days.

(21) Appl. No.: 15/150,794

(22) Filed: May 10, 2016

(65) Prior Publication Data
US 2017/0329488 A1    Nov. 16, 2017

(51) Int. Cl.
| | | |
|---|---|---|
| *G06T 19/00* | (2011.01) | |
| *G06T 19/20* | (2011.01) | |
| *G06F 3/0481* | (2013.01) | |
| *G06F 3/01* | (2006.01) | |
| *G06F 3/0484* | (2013.01) | |
| *G02B 27/01* | (2006.01) | |

(52) U.S. Cl.
CPC ..... *G06F 3/04815* (2013.01); *G02B 27/0172* (2013.01); *G06F 3/011* (2013.01); *G06F 3/017* (2013.01); *G06F 3/04845* (2013.01); *G06T 19/006* (2013.01); *G06T 19/20* (2013.01); *G06T 2219/2004* (2013.01); *G06T 2219/2016* (2013.01)

(58) Field of Classification Search
USPC ........................................................ 345/419
See application file for complete search history.

(56) References Cited

U.S. PATENT DOCUMENTS

| | | | | |
|---|---|---|---|---|
| 9,152,248 | B1* | 10/2015 | Powers, III | A63F 13/06 |
| 9,202,313 | B2* | 12/2015 | Bennet | G06F 3/011 |
| 9,367,136 | B2* | 6/2016 | Latta | G06F 3/017 |
| 9,383,895 | B1* | 7/2016 | Vinayak | G06F 3/017 |
| 9,606,584 | B1* | 3/2017 | Fram | G06F 1/1694 |
| 9,696,795 | B2* | 7/2017 | Marcolina | G06F 3/011 |
| 9,767,613 | B1* | 9/2017 | Bedikian | G06T 19/006 |

(Continued)

FOREIGN PATENT DOCUMENTS

| | | |
|---|---|---|
| EP | 1879129 A1 | 1/2008 |
| EP | 2902998 A1 | 8/2015 |
| WO | 2008/127202 A1 | 10/2008 |

OTHER PUBLICATIONS

International Search Report and Written Opinion for PCT Patent Application No. PCT/US2016/066553, dated Mar. 9, 2017, 13 pages.

(Continued)

*Primary Examiner* — Kimbinh T Nguyen
(74) *Attorney, Agent, or Firm* — Brake Hughes Bellermann LLP

(57) ABSTRACT

Systems and methods are described for generating a virtual environment including at least one three-dimensional virtual object within a user interface provided in a head mounted display device, detecting a first interaction pattern and a second interaction pattern. In response to detecting the second interaction pattern, a modified version of the three-dimensional virtual object at the first virtual feature is generated according to the first interaction pattern and at the second virtual feature according to the second interaction pattern. The modified version of the three-dimensional virtual object is provided in the user interface in the head mounted display device.

24 Claims, 12 Drawing Sheets

(56) References Cited

U.S. PATENT DOCUMENTS

| | | | |
|---|---|---|---|
| 2011/0029903 A1* | 2/2011 | Schooleman | G06F 3/011 |
| | | | 715/764 |
| 2012/0113223 A1* | 5/2012 | Hilliges | G06F 3/00 |
| | | | 348/46 |
| 2013/0278631 A1 | 10/2013 | Border et al. | |
| 2014/0361976 A1* | 12/2014 | Osman | G02B 27/0172 |
| | | | 345/156 |
| 2015/0169076 A1 | 6/2015 | Cohen et al. | |
| 2015/0169175 A1* | 6/2015 | Cohen | G06F 3/04815 |
| | | | 715/852 |
| 2015/0331576 A1* | 11/2015 | Piya | G06F 3/011 |
| | | | 715/850 |
| 2016/0026253 A1 | 1/2016 | Bradski et al. | |
| 2016/0140766 A1* | 5/2016 | Balachandreswaran | G06T 19/006 |
| | | | 345/633 |
| 2017/0003738 A1* | 1/2017 | Silkin | G06F 3/011 |
| 2017/0140552 A1* | 5/2017 | Woo | G06T 7/75 |
| 2017/0185151 A1* | 6/2017 | Pahud | G06F 3/016 |

OTHER PUBLICATIONS

DOVER8, "Independant Object Manipulation with the Leap Motion and Oculus in Unity", retrieved on Feb. 22, 2017 from <https://www.youtube.com/watch?v=iQ9brq2fuul>, Mar. 8, 2016, 1 page.
"Manipulating Actors", Unreal Engines, retrieved on Feb. 9, 2016 from <https://docs.unrealengine.com/latest/INT/GettingStarted/HowTo/ManipulatingActors/index.html>, 8 pages.

\* cited by examiner

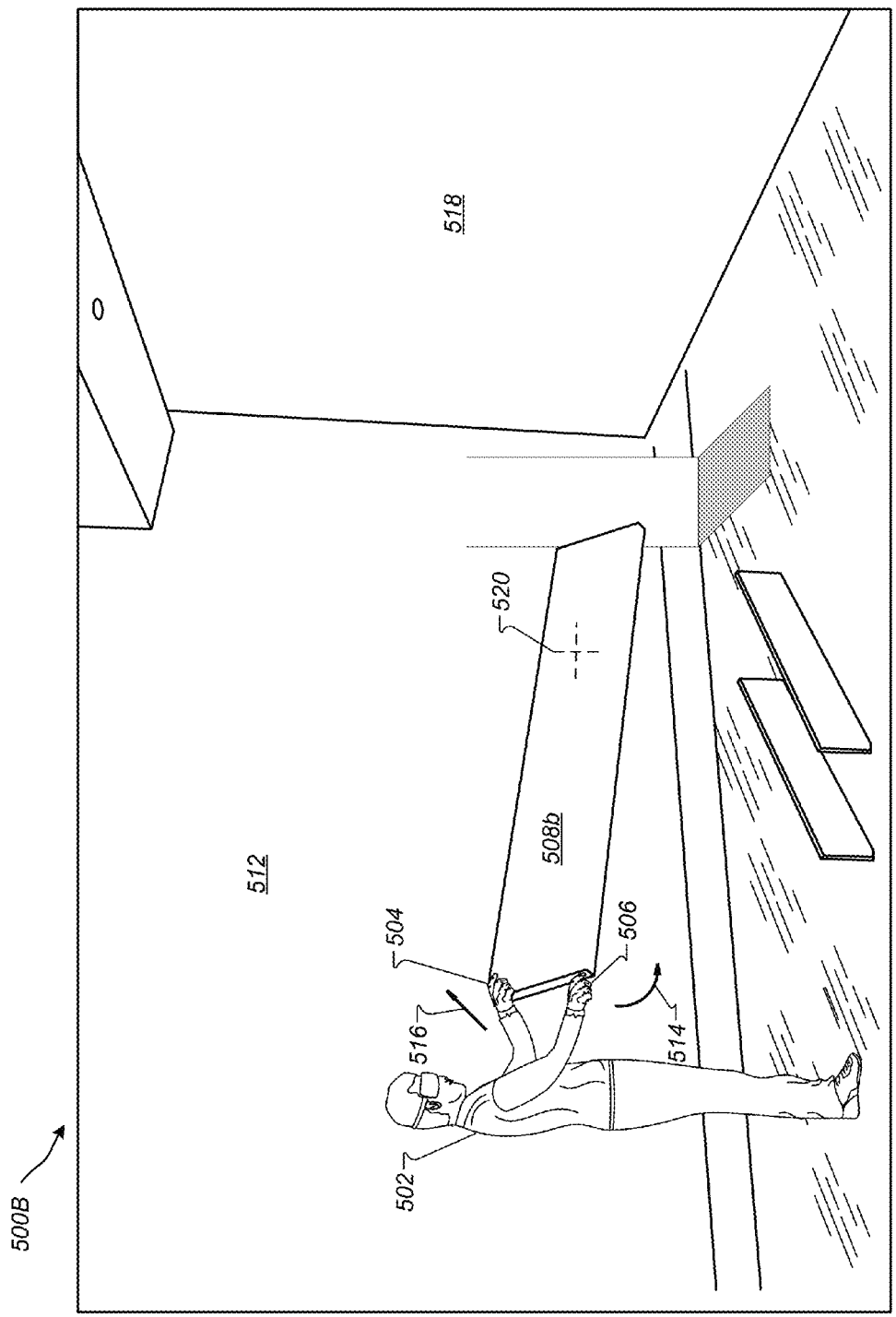

TWO-HANDED OBJECT MANIPULATIONS IN VIRTUAL REALITY

TECHNICAL FIELD

This description generally relates to methods and devices for scaling, rotating, and otherwise manipulating objects in a virtual reality (VR) environment.

BACKGROUND

Object and shape manipulation techniques can be configured to operate on a particular object or alternatively to operate on an environment surrounding the particular object. Such techniques can include deforming and warping objects or environments to accomplish a change in how the object or environment appears. Manipulating objects in a virtual reality environment can present a number of technical problems inherent to user perception of viewing and interacting with such objects.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including generating a virtual environment including at least one three-dimensional virtual object within a user interface provided in a head mounted display device and detecting a first interaction pattern. The first interaction pattern may include an indication to modify a first virtual feature associated with the three-dimensional virtual object. The method may also include detecting a second interaction pattern in which the second interaction pattern includes an orientation and movement corresponding to a modification to be performed on a second virtual feature associated with the three-dimensional virtual object. In response to detecting the second interaction pattern, the method may include generating a modified version of the three-dimensional virtual object at the first virtual feature according to the first interaction pattern and at the second virtual feature according to the second virtual feature according to the second interaction pattern and providing, in the user interface in the head mounted display device, the modified version of the three-dimensional virtual object. Other embodiments of this aspect include corresponding computer systems, apparatus, and computer programs recorded on one or more computer storage devices, each configured to perform the actions of the methods.

Implementations may include one or more of the following features. The method in which the modified version of the three-dimensional virtual object is generated and rendered in the virtual environment while the movement occurs. The method in which the first interaction pattern defines a location in which to begin modifying the first virtual feature, the second interaction pattern defines a direction and orientation away from the second virtual feature, and the modified version of the three-dimensional virtual object includes a scaled version of the three-dimensional virtual object. The scaled version may be scaled from the first virtual feature toward the second virtual feature. The method in which the modified version of the three-dimensional virtual object is adjusted from the first virtual feature to a new position, orientation, and scale of the three-dimensional virtual object and adjusted from the second virtual feature to a new position, orientation, and scale of the three-dimension virtual object. The modified version may be within a user field of view in the virtual environment.

Implementations may also include enabling a uniform scaling mode in response to detecting that the first interaction pattern is performed in the same axis of the three dimensions as the second interaction pattern. The uniform scaling mode may be configured to scale the three-dimensional virtual object evenly in three dimensions according to the first and second interaction patterns.

The method may also include generating a modified version of the three-dimensional virtual object at the first virtual feature according to the first interaction pattern and at the second virtual feature according to the second interaction pattern by stretching and twisting the three-dimensional virtual object. The stretching may include defining a first anchor point and a second anchor point on the three-dimensional virtual object and stretching in a plane formed between the first anchor point and the second anchor point. Twisting the three-dimensional virtual object may include rotating the three-dimensional virtual object in 3D space at the first virtual feature in a first input plane and rotating the three-dimensional virtual object includes rotating the three-dimensional virtual object in 3D space at the second virtual feature from a second input plane to a third input plane The first input plane corresponds to an x-y coordinate plane, the second input plane corresponds to a y-z coordinate plane, and the third input plane corresponds to an x-z coordinate plane, and each plane may be of a three-dimensional coordinate space.

Detecting the first interaction pattern may include detecting a first input associated with a first tracked device and detecting the second interaction pattern includes detecting a second input associated with a second tracked device. The method may also include generating a first intersection point at the first virtual feature based at least in part on detecting a first tracked hand movement performed by a left hand of the user accessing the virtual environment and generating a second intersection point at the second virtual feature, based at least in part on detecting a second tracked hand movement performed by a right hand of the user accessing the virtual environment. The method may also include modifying the three-dimensional virtual object according to the first and second interaction patterns. The modifying may be based at least in part on determining that at least one gesture performed in the first or second tracked hand movement is a change in orientation associated with the three-dimensional virtual object and performing the at least one gesture while modifying the three-dimensional object according to another gesture.

The method may also include generating an anchor point configured to freeze, in three-dimensional space, a portion of the three-dimensional virtual object, at the first intersection point while modifying the three-dimensional object at the second virtual feature according to the second interaction pattern. Generating an anchor point includes defining at least one location on the three-dimensional virtual object as a selectable scaling location, the selectable scaling location being operable to receive a user-initiated input, the user-initiated input including at least one gesture indicating instructions for scaling the three-dimensional virtual object. The method may also include enabling a uniform scaling mode in response to detecting that the first electronic device is oriented to face the second electronic device. The uniform scaling mode may be configured to scale the three-dimensional virtual object evenly in three dimensions according to the first interaction pattern and the second interaction pattern.

The method may also include detecting that the first electronic device is oriented to face the second electronic device includes: detecting an initial position and orientation of the second electronic device relative to the first electronic device. The method may also include tracking at least one gesture performed by the second electronic device relative to the first electronic device and detecting an alignment of the second electronic device to the first electronic device by comparing the initial position and orientation of the second electronic device relative to the first electronic device with a detected updated position and orientation of the first or the second electronic device. The detected updated position may be based on the at least one gesture. Generating a modified version of the three-dimensional virtual object at the first virtual feature includes providing a visual indication, in the virtual environment and affixed to the three-dimensional virtual object, the visual indication including a plurality of anchor points defining snapping frames configured to select at least one coordinate system in which to translate and rotate the virtual object in three dimensions. In response to detecting the second interaction pattern, the method may include defining a rotation path to rotate the three-dimensional virtual object around a location associated with the first virtual feature.

Another general aspect includes a computer-implemented method that includes detecting, in a three-dimensional virtual environment, a first interaction pattern performed by a first electronic device, the first interaction pattern including an indication to modify a first virtual feature associated with a three-dimensional virtual object rendered in the virtual environment. The method also includes detecting, in the three-dimensional virtual environment, a second interaction pattern performed by a second electronic device, the second interaction pattern including an orientation and movement corresponding to a modification to be performed on a second virtual feature associated with the three-dimensional virtual object. In response to detecting the second interaction pattern, generating a modified version of the three-dimensional virtual object at the first virtual feature according to the first interaction pattern and at the second virtual feature according to the second interaction pattern. The method may also include rendering, in a user interface of a head mounted display device, the modified version of the three-dimensional virtual object according to the first interaction pattern and the second interaction pattern. Other embodiments of this aspect include corresponding computer systems, apparatus, and computer programs recorded on one or more computer storage devices, each configured to perform the actions of the methods.

Implementations may include one or more of the following features. The method may also include enabling a uniform scaling mode in response to detecting that the first electronic device is oriented to face the second electronic device. The uniform scaling mode may be configured to scale the three-dimensional virtual object evenly in three dimensions according to the first interaction pattern and the second interaction pattern. Detecting that the first electronic device is oriented to face the second electronic device may include detecting an initial position and orientation of the second electronic device relative to the first electronic device.

The method may also include tracking at least one gesture performed by the second electronic device relative to the first electronic device and detecting an alignment of the second electronic device to the first electronic device by comparing the initial position and orientation of the second electronic device relative to the first electronic device with a detected updated position and orientation of the first or the second electronic device. The detected updated position may be based on the at least one gesture. Generating a modified version of the three-dimensional virtual object at the first virtual feature may include providing a visual indication, in the virtual environment and affixed to the three-dimensional virtual object. The visual indication may include a plurality of anchor points defining snapping frames configured to select at least one coordinate system in which to translate and rotate the virtual object in three dimensions. In response to detecting the second interaction pattern, the method may include defining a rotation path to rotate the three-dimensional virtual object around a location associated with the first virtual feature. The characteristics associated with the virtual object include one or more of a planarity, a dimension, an area, an orientation, a corner, a boundary, a contour or a surface texture for the virtual object.

The method may include generating a virtual reality environment including the three dimensional virtual model of the of the virtual object in the virtual reality environment and automatically scaling the virtual object while rotating the virtual object in three dimensions in the generated virtual reality environment based on a two-hand interaction performed by a user and detected plurality of characteristics associated with the virtual object. Implementations of the described techniques may include hardware, a method or process, or computer software on a computer-accessible medium.

In another general aspect, a system is described that includes at least one computing device configured to generate a virtual environment. The at least one computing device may include a memory storing executable instruction and a processor configured to execute the instructions, to cause the at least one computing device to generate a virtual environment including at least one three-dimensional virtual object within a user interface provided in a head mounted display device, detect a first interaction pattern, the first interaction pattern including an indication to modify a first virtual feature associated with the three-dimensional virtual object, detect a second interaction pattern, the second interaction pattern including an orientation and movement corresponding to a modification to be performed on a second virtual feature associated with the three-dimensional virtual object, and in response to detecting the second interaction pattern, generate a modified version of the three-dimensional virtual object at the first virtual feature according to the first interaction pattern and at the second virtual feature according to the second interaction pattern. The modified version may be provided in the user interface in the head mounted display device. Other embodiments of this aspect include corresponding computer systems, apparatus, and computer programs recorded on one or more computer storage devices, each configured to perform the actions of the methods.

Implementations may include one or more of the following features. The system in which the modified version of the three-dimensional virtual object is generated and rendered in the virtual environment while the movement occurs. The system in which the first interaction pattern defines a location in which to begin modifying the first virtual feature. The second interaction pattern may define a direction and orientation away from the second virtual feature, and the modified version of the three-dimensional virtual object includes a scaled version of the three-dimensional virtual object, the scaled version being scaled from the first virtual feature toward the second virtual feature. The system in which the modified version of the three-dimensional virtual object is adjusted from the first virtual feature to a new position, orientation, and scale of the three-dimensional virtual object and adjusted from the second virtual feature to a new position, orientation, and scale of the three-dimension virtual object in which the modified version is within a user field of view in the virtual environment.

The system may also enable a uniform scaling mode in response to detecting that the first interaction pattern is performed in a shared axis plane with the second interaction pattern, where the uniform scaling mode is configured to scale the three-dimensional virtual object evenly in three dimensions according to the first and second interaction patterns.

In another general aspect, a method is described that includes obtaining, with one or more optical sensors of a computing device, a plurality of characteristics about a virtual object, generating, by a processor of the computing device, a three-dimensional virtual model of the virtual object based on the plurality of characteristics, and processing, by the processor, the plurality of characteristics and the three-dimensional virtual model to define a plurality of anchor points in the three-dimensional virtual model. The plurality of anchor points may be respectively associated with a plurality of selectable regions on the virtual object. In response to receiving an input selecting at least two of the plurality of regions, the method may include correlating the input for each region in the plurality of regions, modifying a size and orientation of the virtual object, based on the correlation and on the plurality of characteristics associated with the virtual object, rendering and displaying a modified virtual object in the three-dimensional virtual model. In some implementations, the plurality of characteristics associated with the virtual object include one or more of a planarity, a dimension, an area, an orientation, a corner, a boundary, a contour or a surface texture for the virtual object.

In some implementations, the method may include generating a virtual reality environment including the three dimensional virtual model of the of the virtual object in the virtual reality environment and automatically scaling the virtual object while rotating the virtual object in three dimensions in the generated virtual reality environment based on a two-hand interaction performed by a user and detected plurality of characteristics associated with the virtual object.

The details of one or more implementations are set forth in the accompanying drawings and the description below. Other features will be apparent from the description and drawings, and from the claims.

BRIEF DESCRIPTION OF THE DRAWINGS

FIGS. 5A-C illustrate examples of a user accessing a VR space to perform virtual object manipulations.

Like reference symbols in the various drawings indicate like elements.

DETAILED DESCRIPTION

Figure 1:
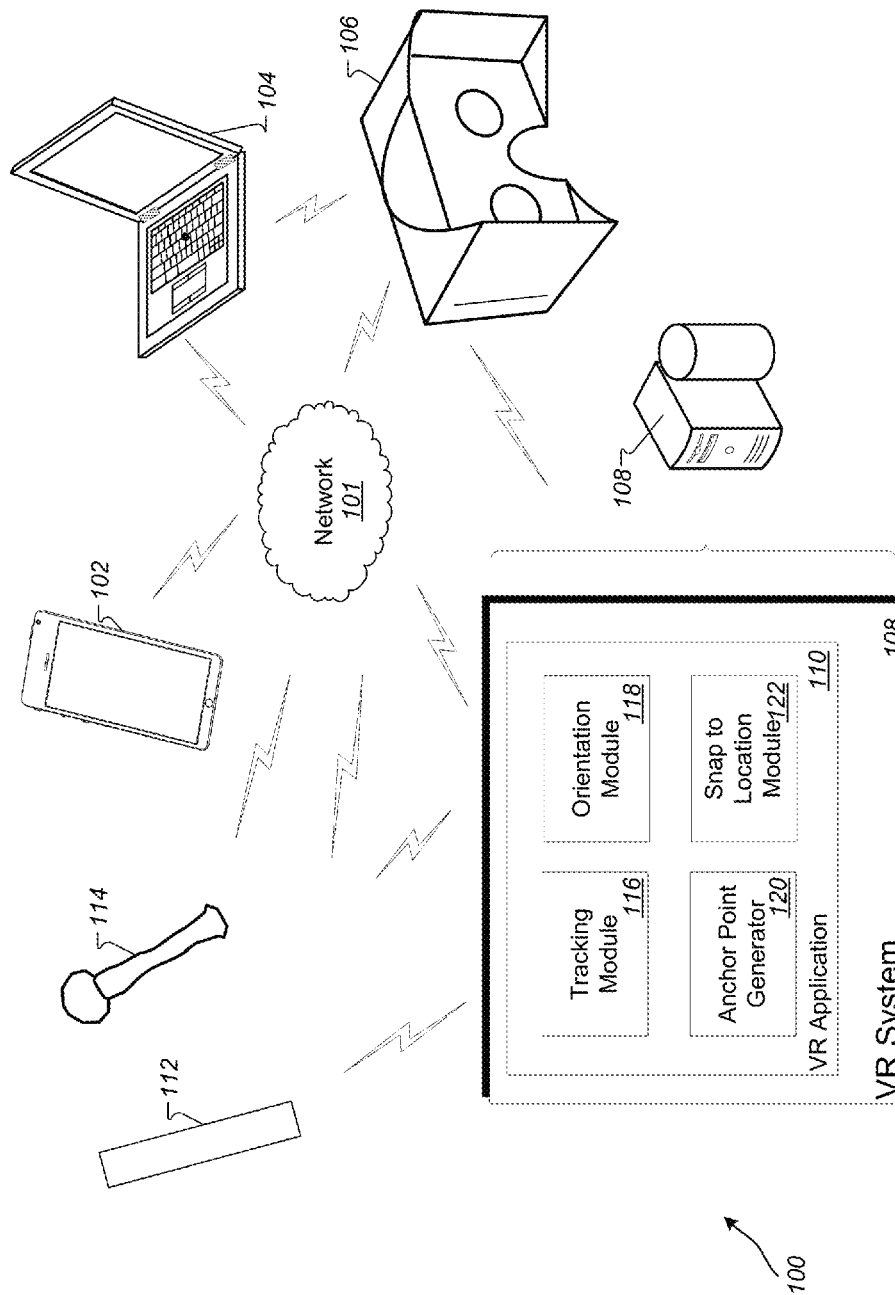
FIG. 1 is a block diagram of an example system for manipulating 2D and 3D content in a virtual reality (VR) space.

A user immersed in a 3D virtual environment wearing a VR headset or a head mounted display (HMD) device may explore the 3D virtual environment/VR space and interact with content and objects in the VR space through various different types of inputs. These inputs may include, for example, physical interactions that are translated into the VR space using the methods and systems described herein. The physical interactions may include manipulation of one or more controller devices separate from the HMD device, and/or through hand/arm gestures, head movements, eye directional gaze, and the like. In general, the hand/arm gestures and controller device movements can be tracked or otherwise sensed to determine positions, locations, orientations, and movements of the hands and/or arms of a user accessing an HMD device in the VR space. Such gestures and movements can be defined to allow users to manipulate virtual objects in an intuitive manner. Hands and arms of the user may be tracked and visually represented in the VR space to visually indicate feedback to the user regarding movements and/or manipulation of virtual objects. In some implementation, the user may be tracked and a full body representation of the user may be visually represented in the VR space.

Interactions and manipulations with virtual objects can be associated with user hand, arm, or controller-based gestures. The association between the virtual objects and user hand, arm, or controller-based gestures can be used to determine that a user wishes to modify particular virtual objects in a specific way. For example, the systems and methods described in this disclosure can facilitate data correlation and exchanges between two hands of a user or two controllers operated by the user by tracking, in three dimensions to enable the user to grasp virtual objects in the VR space and modify such objects. The data correlation and data exchanges between two hands or two controllers can be monitored, tracked, and analyzed to determine, particular movements, positions, rotations, speed, orientation, or other movement within six or more degrees of freedom with respect to hand or controller movements and virtual objects depicted in the VR space. The data correlations and exchanges can enable users to reach out and grasp, touch, or otherwise interact with virtual objects in a manner similar to performing such actions in the physical world.

For example, upon holding a virtual object in one or two locations, users can move the virtual object by rotating, stretching, scaling, twisting, or otherwise manipulating the object using hand gestures/interactions common to handling and working with a physical object. In some implementations, the virtual object may appear, in the VR space, to be attached to portions of the user (e.g., hands, controllers) to facilitate viewing comprehension, for the user, using graphical indications that infer that any movement may move the virtual object in the same fashion as the hands/controllers move while performing additional graphical effects to modify the appearance or behavior of the virtual object.

Information can be gathered by tracking controller or hand movements in the VR space. The information can be used to determine which gesture is being performed by users. The gesture determination can be used to carry out visual manipulations on the objects in any number of ways.

For example, the systems and methods described in this disclosure can correlate movements of a first hand of a user with movements of a second hand of the user. By way of non-limiting example, if the user moves both of her hands outward while clenching her fists, the systems described herein can infer that the user wishes to stretch and/or zoom into a virtual object that the user may be grasping with both hands.

Referring now to FIG. 1 a block diagram is depicted of an example system 100 for providing and manipulating 2D and 3D content in a VR space. In general, the system 100 may provide a 3D VR space and VR content using the methods, components, and techniques described herein. In particular, system 100 can provide a user with a number of options in which to manipulate virtual objects within the VR space.

The example system 100 includes a plurality of computing devices that can exchange data over a network 101. The devices may represent clients or servers and can communicate via network 101, or another network. In some implementations, the client devices may include one or more gaming devices or controllers, a mobile device, an electronic tablet, a laptop, a camera, VR glasses, or other such electronic device that may be used to access VR content.

As shown in FIG. 1, the system 100 includes a mobile device 102, a laptop computing device 104, a VR headset and/or a head mounted display (HMD) device 106, and VR system 108. Devices 102, 104, and 106 may represent client devices. Mobile device 102, computing device 104, and HMD device 106 can include one or more processors and one or more memory devices. The devices 102-106 can execute a client operating system and one or more client applications that can access, control, and/or display VR content on a display device included in each respective device, or in a connected device.

The VR system 108 may represent a server device. In general, VR system 108 may include any number of repositories storing content and/or virtual reality software modules that can generate, modify, or execute virtual reality scenes. In the depicted example, VR system 108 includes a VR application 110 that can access and present content and/or controls for system 108. In some implementations, VR application 110 can run locally on one or more of devices 102-106. The VR application 110 can be configured to execute on any or all of devices 102, 104, 106, and 108 and be controlled or operated upon using controllers 112 or 114, for example.

Particular implementations described in this disclosure may enable a user to use one or more controllers to interact with the VR space. For example, the user can hold a first controller 112 and a second controller 114 to select and manipulate virtual objects in 3D in the VR space. In some implementations, controllers 112 and 114 may be the same make and model. In other implementations, controllers 112 and 114 may be of a different make and model. Regardless of the type of controller, both controllers 112 and 114 can be viewed and/or tracked in system 100 in order to facilitate interaction in the VR space.

Example controllers 112 and 114 may each include a housing in which internal components of the controller device are received, and a user interface (not shown) on an outside of the housing, accessible to the user. The user interface may include a plurality of different types of manipulation devices (not shown in detail in FIG. 1) including, for example, touch sensitive surface(s) configured to receive user touch inputs, buttons, knobs, joysticks, toggles, slides and other such manipulation devices.

One or more sensors can be included on controllers 112 and/or controller 114. The sensors can be triggered to provide input to the VR space, for example, by users accessing controllers 112 and/or 114 and HMD device 106. The sensors can include, but are not limited to, a touchscreen sensors, accelerometers, gyroscopes, pressure sensors, biometric sensors, temperature sensors, humidity sensors, and ambient light sensors. The controllers 112 and 114 can use the sensors to determine an absolute position and/or a detected rotation of controllers 112 and 114 in the VR space. The positions and rotations can then be used as input to the VR space. In one non-limiting example, the controllers 112 and 114 may be incorporated into the VR space as a mobile phone, a paintbrush, a pencil or pen, a drawing tool, a controller, a remote, a laser pointer, or other object etc. Positioning of the controllers 112 and 114 by the user when incorporated into (or represented within) the VR space can allow the user to position particular virtual objects as well as to position mobile phone, paintbrush, pencil or pen, drawing tool, controller, remote, laser pointer or other object in the VR space. Such positioning can be used, in some implementations, as a trigger for manipulating objects using anchor points.

The HMD device 106 may represent a virtual reality headset, glasses, eyepiece, or other wearable device capable of displaying virtual reality content. In operation, the HMD device 106 can execute a VR application, which can playback received and/or processed images to a user through a display (not shown) in the HMD device 106. In some implementations, the VR application 110 can be hosted by one or more of the devices 102, 104, 106, or 108, shown in FIG. 1.

In some implementations, the example HMD device 106 may include a housing coupled to a frame, with an audio output device including, for example, speakers mounted in headphones. In the example HMD device 106, a display (not shown) may be mounted on an interior facing side of the front portion of the housing. Lenses may be mounted in the housing, between the user's eyes and the display. In some implementations, the HMD device 106 may include a sensing system 160 including various sensors such as, for example, audio sensor(s), image/light sensor(s), positional sensors (e.g., inertial measurement unit including gyroscope and accelerometer), and the like. The HMD device 106 may also include a control system including processors and various control system devices to facilitate operation of the HMD device 106.

In some implementations, the HMD device 106 may include one or more cameras (not shown) to capture still and moving images. The images captured by such cameras may be used to help track a physical position of the user and/or the controllers 112 or 114 in the real world, or physical environment relative to the VR space, and/or may be displayed to the user on the display in a pass through mode, allowing the user to temporarily leave the virtual environment and return to the physical environment without removing the HMD device 106 or otherwise changing the configuration of the HMD device 106.

In some implementations, the mobile device 102 can be placed and/or located within the HMD device 106. The mobile device 102 can include a display device that can be used as the screen for the HMD device 106. The mobile device 102 can include hardware and/or software for executing the VR application 110. In some implementations, HMD device 106 can provide full tracking of location and user movements within six degrees of freedom. The tracking can be based on user hand movements, head movements, eye movements, or tracking of controllers moving based on user input.

Additional devices are possible and such devices may be configured to be substituted for one another. In some implementations, the devices 102, 104, 106, and 108 can be laptop or desktop computers, smartphones, personal digital assistants, portable media players, tablet computers, gaming devices, or other appropriate computing devices that can communicate, using the network 101, with other computing devices or computer systems.

In the example system 100, the HMD device 106 can be connected to device 102 or device 104 to access VR content on VR system 108, for example. Device 102 or 104 can be connected (wired or wirelessly) to HMD device 106, which can provide VR content for display.

In some implementations, one or more content servers (e.g., VR system 108) and one or more computer-readable storage devices can communicate with the computing devices 102, 104, 106 using network 101 to provide VR content to the devices 102-106. In some implementations, the network 101 can be a public communications network (e.g., the Internet, cellular data network, dialup modems over a telephone network) or a private communications network (e.g., private LAN, leased lines). In some implementations, the computing devices 102-108 can communicate with the network 101 using one or more high-speed wired and/or wireless communications protocols (e.g., 802.11 variations, Wi-Fi, Bluetooth, Transmission Control Protocol/Internet Protocol (TCP/IP), Ethernet, IEEE 802.3, etc.).

In some implementations, the mobile device 102 can execute the VR application 110 and provide the content for the VR environment. In some implementations, the laptop computing device can execute the VR application 110 and can provide content from one or more content servers (e.g., VR system 108). The one or more content servers and one or more computer-readable storage devices can communicate with the mobile device 102 laptop computing device 104, and/or controller's 112 or 114, using the network 101 to provide content for display in HMD device 106.

As shown in FIG. 1, the VR application 110 includes a tracking module 116, an orientation module 118, an anchor point generator 120, and a snap to location module 122. The tracking module 116 may access light sensors, audio sensors, image sensors, distance/proximity sensors, positional sensors and/or other sensors to track a physical position of the user and/or the controller 112 or 114 in the real world, or physical environment relative to the virtual environment. The orientation module 118 may access any number of memory storage and/or sensors described herein to determine particular orientations of controllers, users, virtual objects, and areas associated with moving objects within the VR space.

The anchor point generator 120 may be configured to identify and/or define anchor points corresponding to one or more locations in which a particular virtual object may be scaled or otherwise manipulated. Anchor points may pertain to locations and/or orientations in which virtual objects may be scaled, zoomed in or out, fixed, moved, twisted, tilted, folded, stretched, shrunken, attached, or otherwise manipulated with respect to one more other or fixed anchor points. The object manipulations may be depicted in an HMD device worn by the user as if the user were to be holding onto one or more anchor points and manipulating the virtual object attached to such anchor points. In some implementations, the anchor points may enable a VR director or user to define locations associated with manipulations or movements that can change the shape, orientation, position, and/or scale of a particular virtual object in the VR space. In general, enabling virtual object manipulations with two-hand interactions can include determining/defining a number of user-selectable anchor points (e.g., locations within VR space) in which to base a movement and/or manipulation of virtual objects.

In some implementations, anchor points may be identified and/or defined as locations in which a particular virtual object is going to be scaled. In some implementations, two anchor points on a virtual object can be used to define a midpoint between both anchor points in which orientation and scale of the object can be configured according to an axis or plane associated with the midpoint. Accordingly, anchor point generator 120 may enable a user in a VR space to change position, orientation, and scale of virtual objects at the same time while the user holds (or otherwise selects) one or more anchor points. The user may view the holding and changing of position, orientation, and/or scale of the virtual object as an illusion that displays the one or more anchor points as fixed on the virtual object while any hand movements may cause a scaling or movement of the object in space. Such scaling or movements can change the shape, orientation, position, and/or scale of the virtual object and these changes can be provided in a user interface in a display of an HMD device.

In some implementations, tracking module 116 and/or orientation module 118 can detect multi-touch or multi-hand interactions with virtual objects. The multi-touch or multi-hand interactions can be interpreted as physical gestures to be carried out on the virtual objects. For example, if a user grasps a portion of a virtual object representing a towel with one hand and a portion of the same towel with the other hand, the user can gesture to twist or wring-out the towel and the systems and methods described herein can show the twisting motion being carried out on the virtual object/towel. Such movements can be performed and depicted with 6 degrees of freedom of movements.

The snap to location module 122 can be configured to provide a snap to location function that allows a user to intuitively select particular areas of a virtual object to fix (or snap) into place, while being able to stretch or otherwise manipulate other aspects of the virtual object. Module 122 can, for example, detect the angle or position of both hands of a user and determine whether particular angles or positions (within six degrees of freedom) trigger a snap to location mode. Snap to location module 122 can be configured to implement a 3D snap to location function which allows the user to intuitively select particular areas of a virtual object to be fixed (or snapped) into place while being able to carry out virtual object manipulations. The snap to location function can be performed by detecting an angle or position of both hands (or controllers) associated with a user accessing a VR space and use such a detection with a number of predefined rules about which angles or positions of the hands (or controllers) trigger snap to location effects associated with the virtual objects. Additional examples will be described in detail below.

In some implementations, VR system 108 can extrapolate different one or two-handed gestures performed by the user (with hands or controllers) and can apply a predefined or inferred gesture to the virtual object. In one non-limiting example, if user movement is tracked by tracking module 116 and the tracking indicates that the user is grasping a virtual object and moving both hands in a circular movement to the right, the orientation module 118 can infer that the user wishes to tilt the virtual object from a first position to a rightward position within the VR space. The movement can trigger the VR system 108 to move the virtual object, in real time, as the user grasps and turns the virtual object rightward. Other angles, directions, movements, and manipulations are of course possible and will be described in detail below.

In another non-limiting example, a user accessing a VR environment/space can be in a virtual room with framed artwork on the wall. The user may walk up to a piece of artwork (i.e., which may be a virtual object in this example) and place her right hand on the lower right corner of the artwork and place her left hand on the lower left corner of the artwork. Once the hands are placed, the orientation module 118 and snap to location module 122 can provide additional action possibilities to the user based on tracking the hands and based on tracking additional movements in relation to the artwork (i.e., the virtual object). For example, modules 118 and 122 can enable the user to re-shape, deform, shrink, enlarge, or otherwise manipulate the artwork in any direction that the hands may be moved. In particular, if the user holds the left hand steady and moves the right hand rightward or downward or in both directions, the artwork may be enlarged or stretched in the direction corresponding to the right hand. In some implementations, this may include manipulating the artwork in three dimensions with six or more degrees of freedom. For example, the user can work in an x-y-plane to enlarge the artwork such that the artwork would cover additional wall space rightward and/or downward. Upon completing the enlargement, the user can pull both hands in an arching motion inward in a z-plane direction to curve the artwork inward in the z-plane direction. Alternatively, pulling both hands toward the user can be interpreted as removing the artwork from the wall, for example, in preparation for moving the artwork to another wall.

Figure 2:
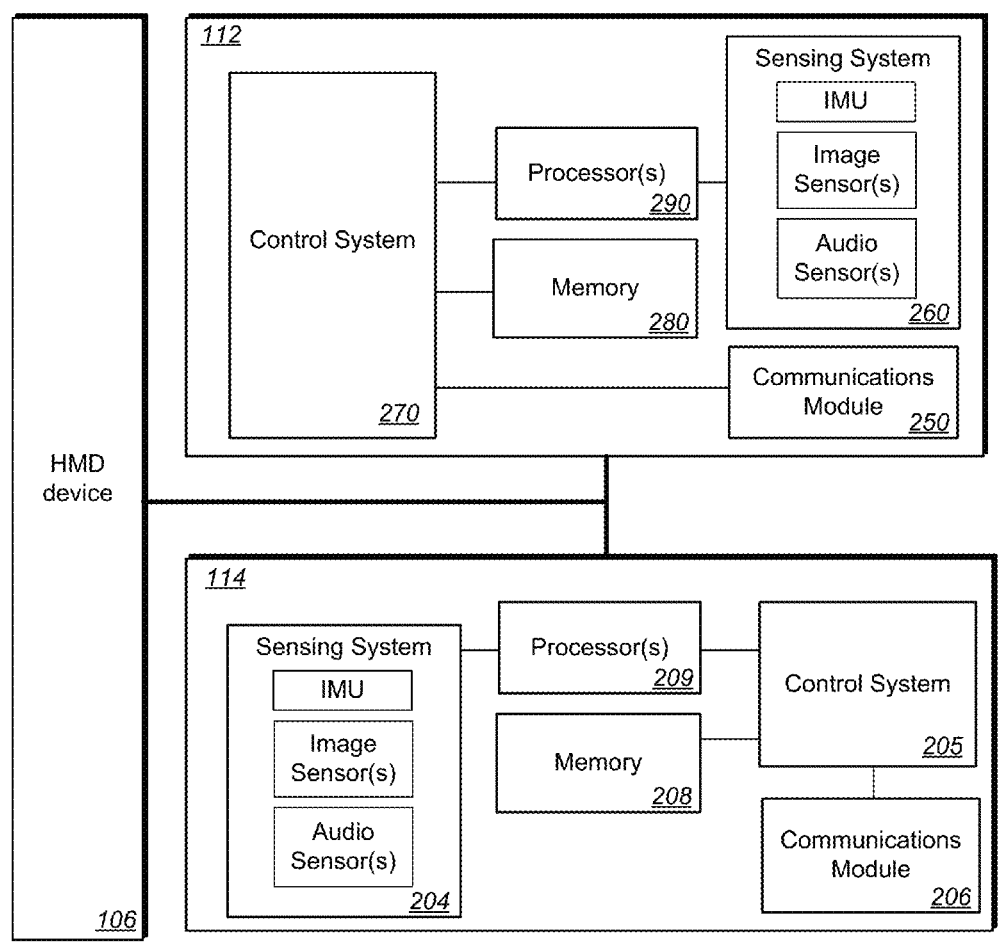
FIG. 2 is a block diagram depicting controllers communicably coupled to an HMD device in a VR space.

FIG. 2 is a block diagram depicting controllers communicably coupled to an HMD device in a VR space. In operation, system 100 can be configured to provide a VR space housing any number of virtual objects that can be manipulated with the devices shown in FIG. 2. The controllers 112 and 114 may interface with HMD device 106 to generate an immersive virtual environment. The controller 112 and the controller 114 may be paired with HMD device 106, for example, to establish communication between the devices and to facilitate user interaction with the immersive VR space. In some implementations, neither controller 112 and 114 is paired to HMD device 106, but each are instead tracked by tracking module 116 in VR application 110 or another external tracking device.

As shown in FIG. 2, the controller 112 includes a sensing system 260 and a control system 270. The sensing system 260 may include one or more different types of sensors, including, for example, a light sensor, an audio sensor, an image sensor, a distance/proximity sensor, a positional sensor (e.g., an inertial measurement unit (IMU) including a gyroscope and accelerometer) and/or other sensors and/or different combination(s) of sensors, including, for example, an image sensor positioned to detect and track eye gaze associated with a user. The control system 270 may include, for example, a power/pause control device, audio and video control devices, an optical control device, a transition control device, and/or other such devices and/or different combination(s) of devices. The sensing system 260 and/or the control system 270 may include more, or fewer, devices, depending on a particular implementation.

The controller 112 may also include at least one processor 290 in communication with the sensing system 260 and the control system 270, a memory 280, and a communication module 250 providing for communication between controller 112 and another, external device, such as, for example, controller 114 and/or HMD device 106.

Controller 114 may include a communication module 206 providing for communication between controller 112 and another, external device, such as, for example, HMD device 106. In addition to providing for the exchange of data between controller 112 and controller 114, and HMD device 106, the communication module 206 may also be configured to connect and/or communicate with a number of other electronic devices, computers, and/or controllers accessible to the VR space and system 100.

The controller 114 may include a sensing system 204 including an image sensor and an audio sensor, such as is included in, for example, a camera and microphone, an IMU, a touch sensor such as is included in a touch sensitive surface of a controller, or smartphone, and other such sensors and/or different combination(s) of sensors. At least one processor 209 may be in communication with the sensing system 204 and a control system 205. The control system 205 may have access to a memory 208 and can control overall operation of controller 114.

Similar to controller 112, the control system 205 of controller 114 may include, for example, a power/pause control device, audio and video control devices, an optical control device, a transition control device, and/or other such devices and/or different combination(s) of devices. In general, the systems and methods described in this disclosure can track user hands or controllers 112 and 114 and analyze user interaction patterns and gestures associated with such hands and/or controllers 112 and 114 in the VR space to determine the intent of such interaction patterns and gestures.

Figure 3A:
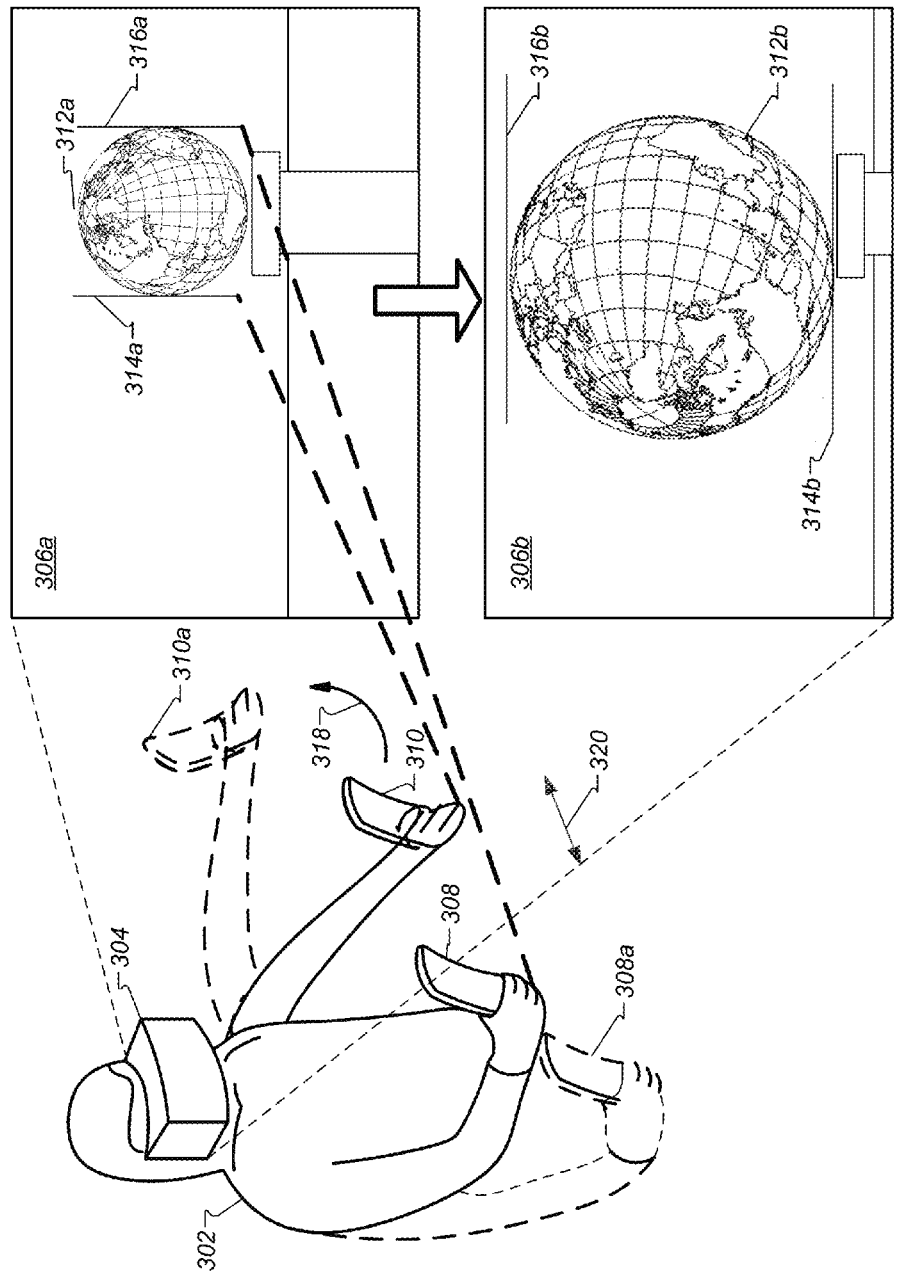
FIGS. 3A-3B illustrate a user accessing a VR space to perform virtual object manipulations.
Figure 3B:
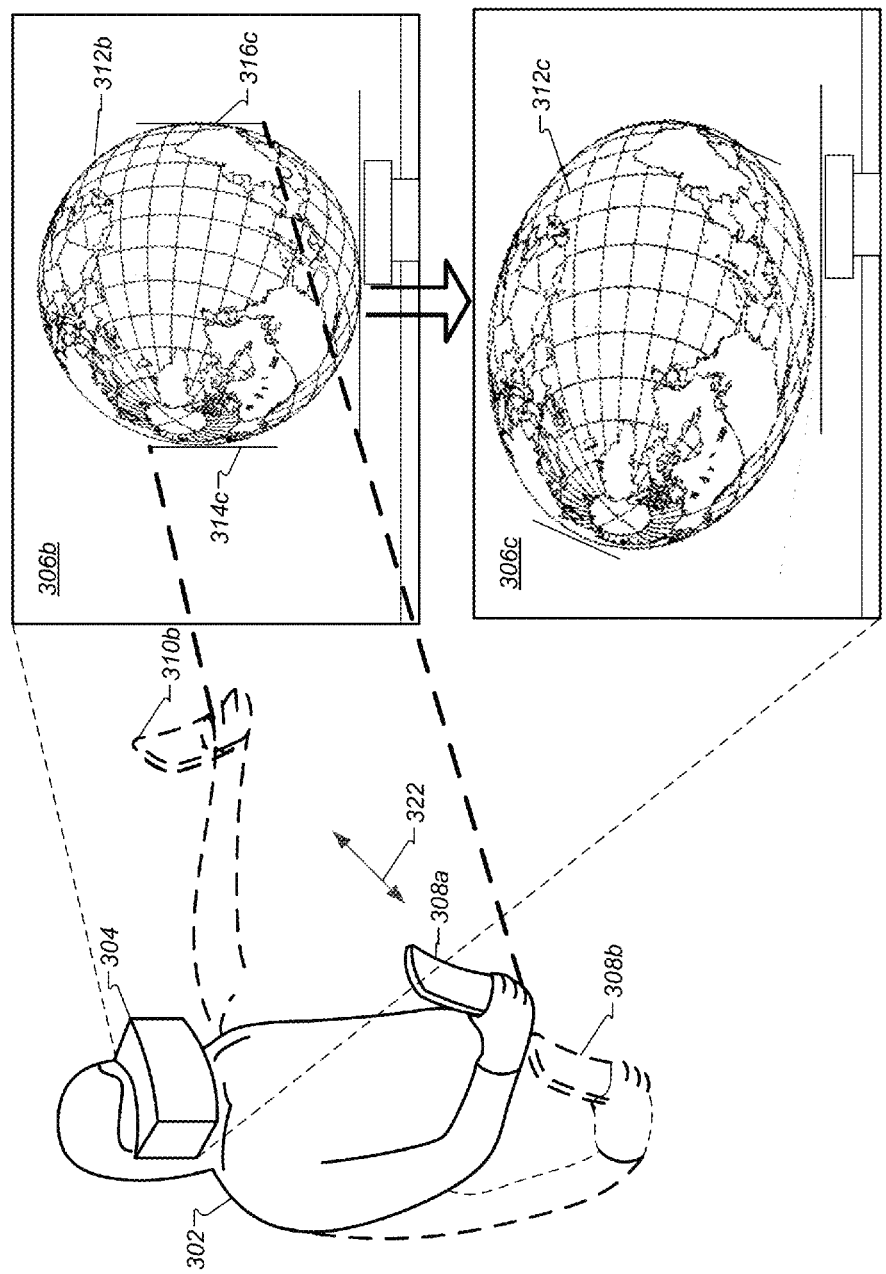

FIGS. 3A-3B illustrate a user accessing a VR space to perform virtual object manipulations. The example implementation shown in FIGS. 3A-B will be described with respect to a user wearing an HMD device that substantially blocks out the ambient environment, so that the HMD device generates a virtual environment, with the user's field of view confined to the VR space generated by the HMD device. However, the concepts and features described below with respect to FIGS. 3A-B may also be applied to other types of HMD devices, and other types of virtual reality environments and augmented reality environments. In addition, the examples shown in FIGS. 3A-B include a left side of each figure that illustrates a third-person view of the user wearing the HMD device 304 and holding the controllers 308 and 310, and the right side of each figure illustrates a first person view of what may be viewed by the user 302 in the virtual environment generated by the HMD device 304. In particular, an initial view of the VR space is shown on the top right of FIGS. 3A-B, while an updated, modified view of the VR space is shown in the bottom right. In some implementations, controllers 308 and 310 are not associated with the examples in FIGS. 3A-3B and, instead, tracked fingers, thumbs, hands, feet, head, or other body part can be substituted for controller input.

In the example shown in FIG. 3A, the user 302 wearing an HMD device 304 is facing into a room defining the user's current ambient environment/VR space (shown by view 306a), or current real world space. The HMD device 304 may capture images and/or collect information defining features in the VR space. The images and information collected by the HMD device 304 (or by one or more controllers 308 or 310) may then be processed by the HMD device 304 to render and display a 3D model of the VR space and any number of models of virtual objects. In some implementations, this 3D rendered model of the VR space may be representative of the actual ambient environment, but not necessarily be an exact reproduction of the actual ambient environment (as it would be if, for example, a pass through image from a pass through camera were displayed instead of a rendered 3D model image).

The HMD device 304 may process captured images of an environment to define and/or identify various features for said environment, such as, for example, corners, edges, contours, flat regions, textures, grid locations, snap to location areas, anchor points, and the like. From these identified features, other characteristics of the environment, such as, for example, a relative area associated with identified characteristics or objects, an orientation of identified characteristics or objects (for example, horizontal, vertical, angled), etc.

In some implementations, a previously generated 3D model of a known VR space may be stored, and the known VR space may be recognized by the system. The stored 3D model of the VR space may be accessed for use in a new VR session. In some implementations, the previously stored 3D model of the known VR space may be accessed as described, and compared to a current scan of the VR space, so that the 3D model may be updated to reflect any changes in the known VR space such as, for example, changes in furniture placement, other obstacles in the environment and the like which may obstruct the user's movement in the VR space and detract from the user's ability to maintain presence. The updated 3D model may then be stored for access during a later session.

In the example in FIG. 3A, the user 302 may be accessing the VR space and viewing a virtual object, such as globe 312a in view 306a. Although user 302 is shown outside of VR space in view 306a, in operation, the user 302 may be in the VR space and able to view his hands, arms, body, while interacting with content in the VR space.

At some point, the user 302 can decide to pick up the virtual object (e.g., globe 312a) by reaching out to connect/collide with portions of globe 312a. For example, the user 302 can reach and place or direct the controller 308 at point 314a and place or direct the controller 310 at point 316a. In a similar fashion, the user may simply use her hands to reach out and connect/collide with portions of globe 312a. Regardless of whether the user employs controllers or hands, the system 100 can track the movement, orientation, and position of either or both. The tracking can continue as the user 302 reaches to obtain or otherwise handle the globe 312a and during any manipulation of globe 312a. For example, as user 302 places her controllers at 314a and 314b, she may begin to tilt and stretch the globe 312a by grasping both controllers 308 and 310 and moving her left hand to a position shown by controller 310a, the movement of which is indicated by arrows 318 and 320. At the same time, or shortly before or after moving her left hand, the user can move her right hand to a position shown by controller 308a, the movement of which is indicated by arrow 320.

Here, the movement is in an outward motion for both hands indicating to the system 100 that the user wishes to stretch or enlarge the globe 316a while tilting or rotating the globe 312a sideways. The result of the movements are shown in view 306b. In this example, the user's hands may have ended up at point 314b and 316b and a resulting updated view 306b depicts the globe 312b as larger and tilted in the direction of the movement performed by the user 302. In operation, the user 302 may view each interim view of the moving globe 312a until the user stops manipulating the globe and the globe comes to rest, as shown by view 306b.

FIG. 3B shows the user 302 making additional modifications to virtual object/globe 312b. In this example, the user decided to grab the globe 312b at point 314c and 316c and stretch the globe outward, shown by arrow 322, to flatten the globe, as shown at globe 312c in view 306c. In this example, the user 302 moved controller 308a to position shown at controller 308b while maintaining the position of her controller 310b. Additional manipulations of virtual objects and the surrounding VR space can be performed.

In some implementations, the controllers 308a and 310b, and in some instances, also the user's hands, may be detected, and the movement of the detected controllers (and hands) may be tracked by the system 100. This may allow an image of the detected controllers 308a and 310b (and hands) to be rendered as the controllers move toward the globe.

In some implementations, the systems and methods described in this disclosure provide a snap to location function that allows a user to intuitively select particular areas of a virtual object to fix (or snap) into place, while being able to stretch or otherwise manipulate other aspects of the virtual object. The system 100 can, for example, detect the angle or position of both hands of a user and determine whether particular angles or positions (within six degrees of freedom) trigger a snap to location mode. For example, if the system 100 detects each hand is position with both thumbs pointing inward while holding a virtual object, an inference can be made to snap to location the portion of the virtual object on a side opposite the placement of the hands on the object. The inference may be obtained by obtaining particular details about the object and detecting particular gestures performed by the user while hand tracking. Similarly, if the user is holding a controller or one controller in each hand, the system 100 can obtain similar information by tracking the gestures performed using the controllers.

In one non-limiting example, a user accessing a VR space can pick up a three-dimensional virtual object with one or both hands and can move the object in any manner to select one of many ways in which to orient the object while using both hands (or controllers) to snap to location by gesturing in a specific way. One example gesture may include holding both hands (or both controllers) in parallel while rotating and scaling the object. The parallel gesture may indicate that the user wishes to fix a center of the virtual object while rotating the object about the center point during an operation/gesture performed by the user's hands (or controllers) to shrink or stretch the object. In some implementations, system 100 can select one or more properties of the virtual object in which to change based on any combination of user gesture, hand/controller tracking, and/or predefined object properties.

In some implementations, the system 100 can determine which direction an object is held by a left and right hand of the user. For example, the tracking module 116 can detect a position of each hand while the orientation module 118 can detect the orientation of each hand. Such information can be used by the anchor point generator 120 to generate one or more anchor points in which to move the object about. If a particular orientation or gesture is detected, the snap to location module 122 can fix a portion of the object to a location in the VR space. For example, if the system 100 detects that the fingers of the user are all facing each other, a single axis running parallel to the hands may be selected for rotations, snap to locations, growth or shrinkage along the selected axis, or along a particular dimension or plane with respect to the selected axis.

The following non-limiting examples can be performed by system 100 in response to user gestures being detected in a VR space. Such gestures can be associated with any number of coordinate systems, grids, or other metrics that can be applied to virtual objects. In some implementations, the snap to location module 122 can calculate particular object coordinates by rounding a location of a virtual object to a nearest grid location.

In some implementations, the anchor point generator 120 can configure any number of anchor points on a virtual object. The snap to location module 122 can use such anchor points to define snap locations on the virtual object. In one non-limiting example, the snap to location module 122 can use defined anchor points to snap virtual object rotations to 90-degree orientations. For example, module 122 can define up to twenty-four 90-degree, snap to location orientations for a particular virtual object. Such a definition may allow for six degrees of freedom of control during object movements that are snapped to locations.

In some implementations, the snap to location module 122 can invoke a hysteresis snap function in which the system 100 can track user movement with respect to a virtual object to determine when a particular boundary is crossed. When the boundary is crossed, the snap to location module 122 can snap the object to a location configured for the virtual object. In general, the snap to location module 122 can define or retrieve a particular geometry of a 3D virtual object and can define one or more snap centers. The snap centers may be snapping frames that define a coordinate system with a translation (3D) and a rotation (quaternion).

In a non-limiting example, a user accessing VR space may begin to grasp onto or otherwise interact with a virtual object with a hand in a first location on the virtual object. The system 100 can define the first location in 3D space by defining a quaternion representing orientations and rotations of the virtual object. In particular, a forward axis can have a rotation component that defines how the virtual object rotates around the forward axis. Such a definition can fix (or constrain) the other two axes. When the user grasps or touches a second location on the virtual object, the system 100 can define a rotation path around the defined first location according to the constrained axes. In another example, if the user grasps or touches the first location (i.e., anchor point) and the second location (i.e., anchor point) on the object, the system 100 may simply define constraints using a vector generated between both anchor points of the object as the axis to be constrained and the axis can be used as a basis to freely rotate the virtual object around.

The anchor point generator 120 and/or the snap to location module 122 can use snapping frames to implement a number of steps to enable snap functions including, but not limited to, a hysteresis snap function for a virtual object. The steps may include determining a longest component of a particular forward facing vector (e.g. unit vector) with respect to a frame defined on the object. Such a frame may be configured with coordinates and locations in which snapping of portions of virtual objects can be invoked. The snap to location module 122 can assign the determined longest component of the vector as one while the two other components of the vector may be assigned to zero. Next, the module 122 can determine a longest component of a right vector (e.g., unit vector) associated with the frame and can assign that vector to one, while setting the other associated vectors to zero. Upon assigning both of the above vectors, the snap to grid module 122 can calculate a third vector from the cross product of the first two vectors, thus determining a new snap quaternion in which to allow snap to location activity by a user. In some implementations, the hysteresis option for this method may be obtained through defining a certain length threshold for the vector to cross before snapping, rather than defining the longest component.

The quaternion definitions above can be used to allow a user to interact with virtual objects in the VR space in a way to allow snapping (e.g., fixing) objects to locations within the VR space. For example, a vertical and horizontal centerline can be preconfigured for a virtual object, such as a shelf. If one or both controllers or hands handling the object crosses from front to back, back to front, or side to side across any of the centerlines, the system 100 may infer that the user wishes to connect or remove the shelf from a virtual wall, for example, and may provide visual indicators on the virtual object (e.g., shelf) to signal to the user that the object can be snapped to a location along a line or area of visual indicators.

In some implementations, a virtual object may be shown in the VR space as snapped into place at a particular location, while a transparent outline (i.e., or other visually distinguished graphical effect) of the virtual object may be shown to enable the user to better understand the state VR space with respect to a movable virtual object. This can include depicting snapped virtual objects as similarly shaped unsnapped objects in a visually distinctive way to enable the user to understand that the snapped object may be unsnapped in a particular way.

In one example, the system 100 can define particular portions of virtual objects and/or anchor points associated with virtual objects with visual indicators. The indicator may be graphically provided in the VR space, for example, a transparent ball or a transparent ray intersecting the object. These visual indicators may be mechanisms providing visual feedback so that the user can trigger an object to be selected or interacted upon. For example, if the user reaches toward a virtual object and grasps the object, the system 100 can detect this and provide a visual indicator indicating to the user that she has triggered the object to be manipulated in some fashion. The detection can be performed by the tracking module 116, for example. Once the trigger occurs, the user may drag or move the object as well as scale and rotate the object according to the anchor points defined on the object. Thus, when the user changes an orientation or position of her hand (or controller), the virtual object can follow suit and be modified according to the changed orientation or position. In addition, while changing orientation, position, or both, the user can use her hands (or controller) to change a scale of the virtual object.

In some implementations, the snap to grid module 122 can enable snapping virtual objects using bounding boxes to allow for translations. Such translations can include eight translation anchor points of a three-dimensional virtual object, for example. In particular, the VR space and/or virtual objects can be defined with anchor points that allow for translation and snap to location against a grid or against an adjacent bounding box/anchor point of another virtual object. A threshold may be defined to determine a distance in which to auto-engage one bounding box point to another bounding box point (e.g., one anchor point to another anchor point). For example, module 122 can be configured to auto-snap particular anchor points according to a minimum distance between two converging anchor points. The anchor points may begin to converge, for example, if a user brings two virtual objects or two anchor points on the same virtual object close together. The minimum closeness before a snap occurs may be defined by the minimum distance.

Figure 4:
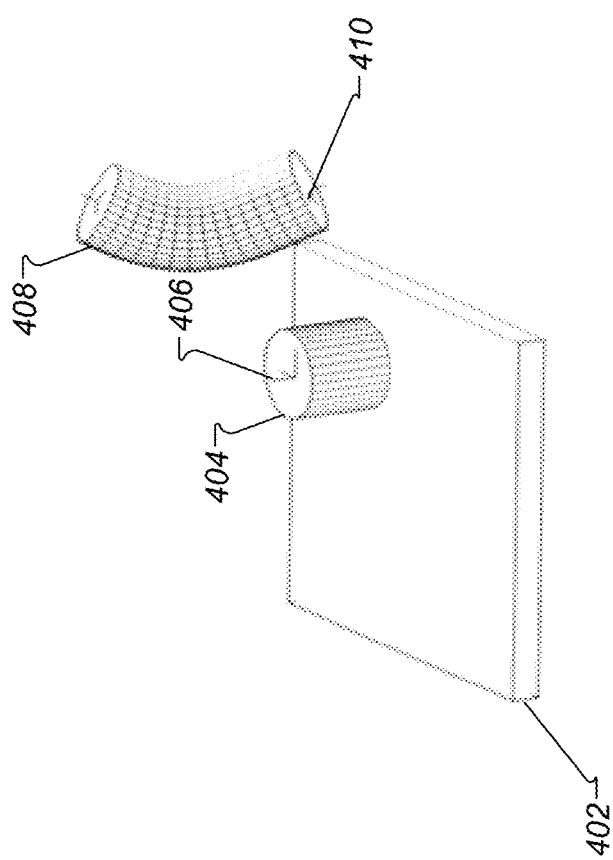
FIG. 4 is a block diagram depicting an example of snapping virtual objects to locations.

Besides defining snap locations on boundaries of virtual objects (e.g., on bounding boxes), the snap to location module 122 can define a number of snapping locations inside virtual objects. For example, FIG. 4 illustrates an example rectangular piece of floor 402 with a pipe end 404 protruding from the floor 402. In the center of the pipe end 404 a snapping frame 406 is shown. The snapping frame 406 is configured to enable a snapping of pipe modules, such as module 408. Pipe module 408 includes another snapping frame 410 in which to indicate to a user that the snapping frame 406 can be snapped to another component. In some implementations, snapping to a particular frame, grid, point, anchor point, etc. can be used to also define an origin in which to scale or rotate a virtual object. In the example in FIG. 4, a pipe 408 can be snapped to snapping frame 406 and then scaled or rotated inward in any direction.

In some implementations, the snap to location module 122 can enable snapping multiple points on one or more virtual objects at the same time. Such snapping points may be configured to be connected along a seam, edge, or other boundary in response to the system 100 detecting that one snapping point in any number of correlated snapping points has been connected together by a user, for example.

In general, a snapping frame can take on any shape, size, or area within a coordinate system corresponding to virtual objects or virtual space surrounding virtual objects. The frame may be defined and associated with the VR space, particular users, particular virtual objects, or particular boundaries within the VR space or users accessing the VR space.

In another example, the snap to location module 122 can be used to define particular attraction points or magnetized-like points in which to snap together anchor points from a number of different virtual objects. In one non-limiting example, a first corner of a rectangular tile with four corners may be snapped to another corner of another rectangular tile with four corners based on a defined attraction between the corners of each respective object. Additional attraction points can be defined and such points may be defined by one or more point arranged in any shape.

Figure 5A:
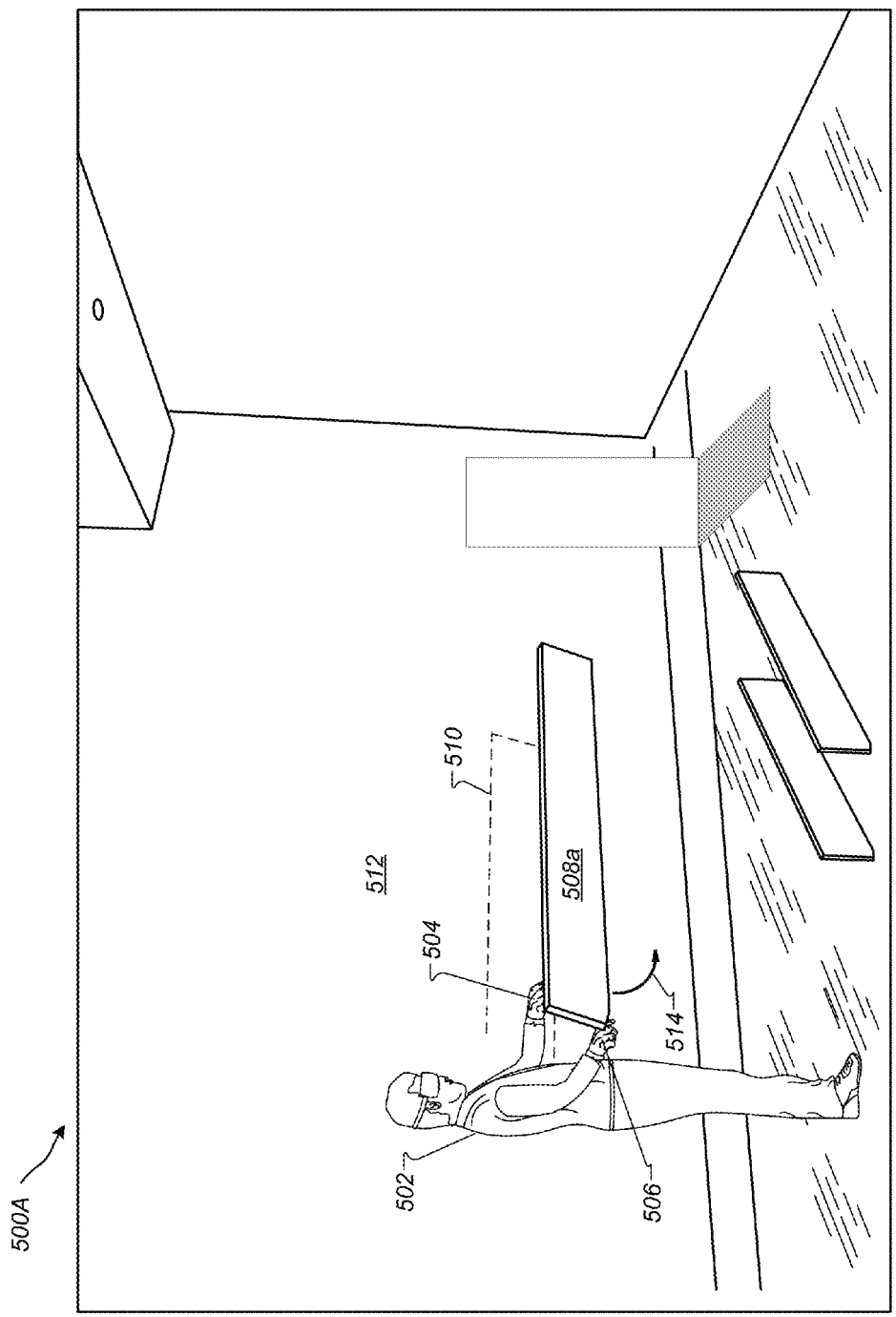
Figure 5C:
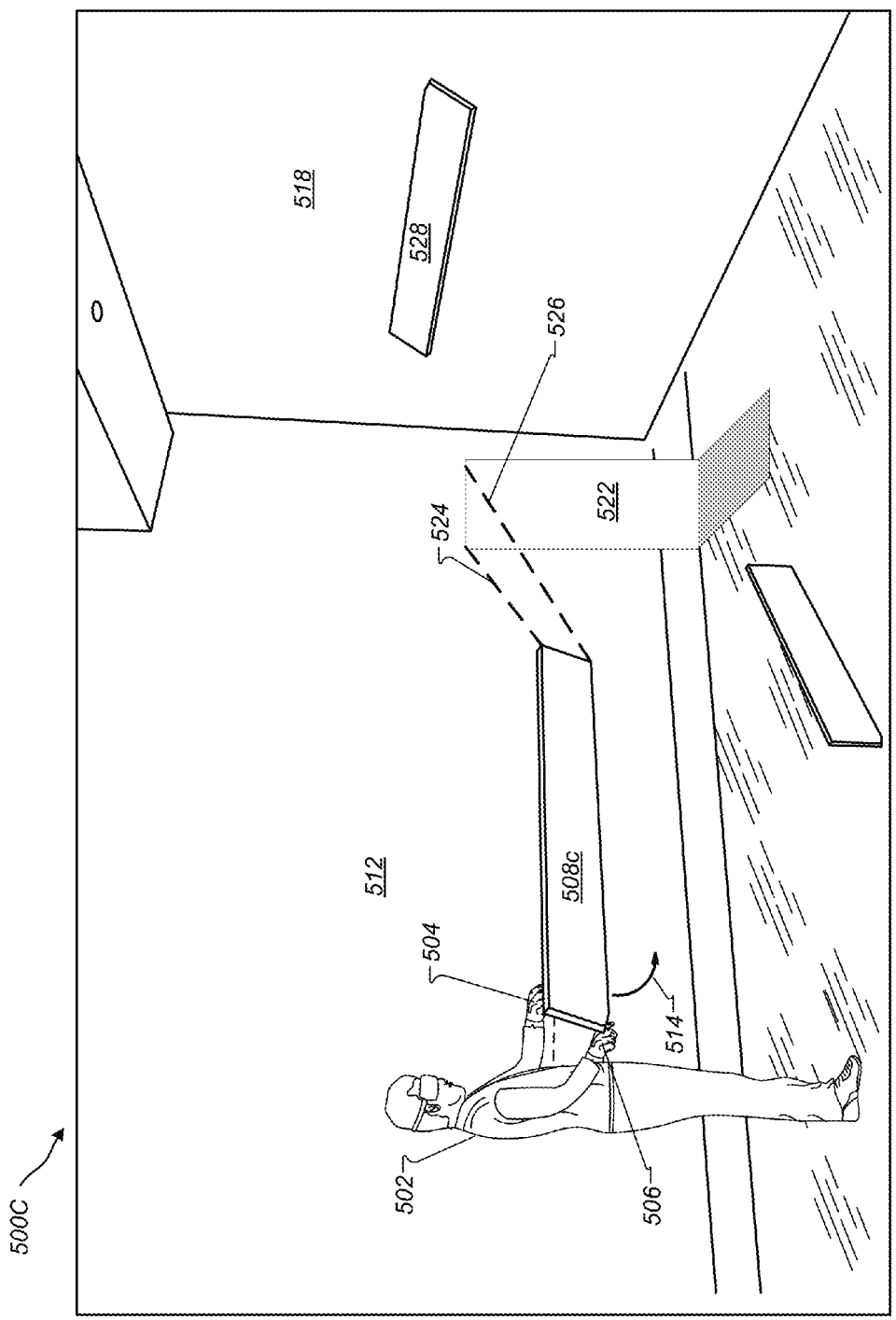

FIGS. 5A-C illustrate examples of a user accessing a VR space to perform virtual object manipulations. In general, the system 100 can analyze user interactions in the VR space to determine how to manipulate a particular virtual object based on detected user interactions. The determination can be used to provide the user with a response that is directed to a desired object manipulation requested by the user via the detected user interaction/gesture. For example, when the user attempts to grasp (e.g., reaches for) a virtual object with her hand, the hand begins to approach a user interface surface that can react in a number of different ways. The system 100 can determine which (VR space-based) reaction matches the intent for the user and can react according to information associated with properties of the virtual objects and the VR space.

In one non-limiting example in FIG. 5A, a VR space 500A is shown with a user 502 interacting with a number of virtual objects. In particular, the user 502 grasps his first hand 504 and his second hand 506 onto two points of virtual shelf 508. The two-handed grasp may begin to trigger features associated with the virtual shelf 508*a*. For example, the system 100 can determine that the two-handed grasp on one side of the shelf indicates that the user may wish to attach an opposite end of the shelf to existing objects in the VR space. For example, the system 100 can infer that tracked hand 504 intends to interact with virtual shelf 508*a*, while determining that tracked hand 506 is grasping shelf 508 to do the same. The two-handed grasping may additionally trigger one or more graphical indicators to communicate to the user one or more ways to modify or move particular virtual objects. For example, visual indicator 510 may be displayed upon detecting the two-handed grasp on virtual shelf 508*a*. The indicator 510 shows that the shelf may be attachable to wall space 512. In some implementations, other visual and/or audio indicators and actions can be depicted to alert the user to possible interaction in the VR space. In operation, the system 100 can wait to detect additional gestures or movements performed by the user and can implement graphical object changes to content in the VR space according to the gestures or movements.

In the depicted example, the user may move his right hand 506 upward and his left hand 504 downward, as shown by arrow 514, which can begin to move shelf 508*a* into position to be mounted on wall 512 in location 510, or another location along wall 512, since location 510 is simply a graphical indicator for notifying the user of an activity of placing the shelf on the wall.

In some implementations, the system 100 can infer that tracked hand 504 intends to interact with virtual shelf 508, while determining that tracked hand 506 is grasping shelf 508*a* in a same plane. If the system 100 detects that both hands (or both controllers if the user were using controllers) are in the same axis or plane of reference, the system 100 can trigger a uniform scaling mode to uniformly move and/or scale a virtual object. In the depicted example of FIG. 5B, the user 502 grasps virtual shelf 508*a* (from FIG. 5A) with both hands 504 and 506 in the same plane. In response, the system 100 may trigger the uniform scaling mode and allow the user to begin scaling the virtual shelf 508*a* into the shelf shown at shelf 508*b*, according to user-performed gestures, indicated by arrows 514 and 516. In particular, the system 100 can determine, based on tracked user movements, that the user wishes to uniformly scale/stretch shelf 508*a* to obtain shelf size shown by shelf 508*b*. The user movement indicated by arrow 516 shows an upward stretch of the shelf, which triggers a uniform growth of the entire shelf toward wall 518 as well. In addition, a rotation is performed at the same time as the scaling, as indicated by arrow 514 showing the right hand 506 of the user twisting upward. Visual, audio, or tactile indicators can be provided to communicate to the user that a particular mode has been triggered. For example, indicator 520 may indicate triggering of uniform scaling mode.

Referring to FIG. 5C, another example is shown in which user 502 is handling virtual shelf 508*c*. In this example, the system 100 can identify tracked hands or controllers, virtual objects, and properties of such objects. One example property of a virtual object may include defined anchor points in which to use snap to location functionality for objects and content within the VR space. Here, the system 100 may identify one or more anchor points on virtual shelf 508*c*. The anchor points can be used to indicate to the user whether any snapping points are within range of the virtual shelf 508*c*. As shown, the system 100 detects that shelf 508*c* includes two anchor points that may naturally fit with two other anchor points on corners associated with shelf portion 522. In particular, visual indicators 524 and 526 can be shown to let the user understand that a snap to location function is available. The indicators may, for example, become visible upon detecting that the virtual shelf 508*c* is approaching shelf portion 522 based on a user-performed action involving the virtual shelf 508*c*.

In a similar fashion, anchor points may be visually depicted near shelf 528 to indicate that additional shelf components can be added to shelf 528. Such visual indicators may not be provided to the user until the user approaches the wall 518 and falls within a predefined proximity or perimeter around shelf 528, for example. Additional details regarding snap to location is described above.

Figure 6:
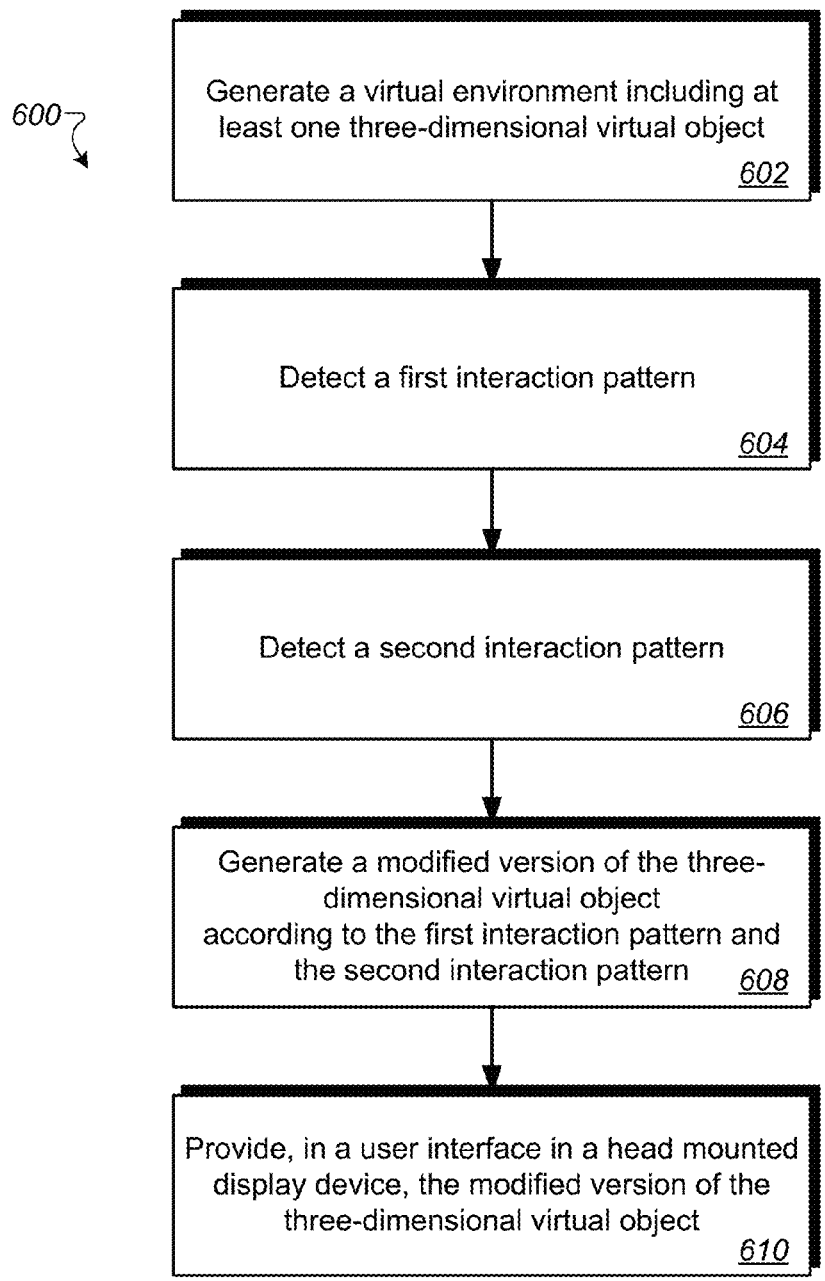
FIG. 6 is a flow chart diagramming one embodiment of a process to enable a user to manipulate content in a VR space.

FIG. 6 is a flow chart diagramming one embodiment of a process 600 to enable a user to manipulate content in a VR space. At block 602, the system 100 can generate a virtual environment including at least one three-dimensional virtual object within a user interface provided in a head mounted display device. For example, VR system 108 can generate a VR space with any number of virtual objects that can be manipulated by user hand movements or controller movements. The system 108 can generate representations of users, objects, and controllers, and can track such things for translation into the VR space based on movements and gestures carried out in the physical world.

At block 604, the system 100 can detect a first interaction pattern. For example, a user accessing controllers 112 or 114 can provide input in the form of a first interaction pattern such as actually grasping onto a virtual object or simulating grasping using a controller 112 or 114. In some implementations, the first interaction pattern is performed with a users hand, arm, eye gaze, leg, foot, or other part capable of triggering interaction in the VR space. The placement and direction of the grasp may be detected as a pattern indicating an intent to modify a first virtual feature associated with the three-dimensional virtual object being grasped. For example, the pattern may be a grasp and pull to bring the virtual object closer the user. In some implementations, the first interaction pattern defines a location in which to begin modifying the first virtual feature, the second interaction pattern defines a direction and orientation away from the second virtual feature, and the modified version of the three-dimensional virtual object includes a scaled version of the three-dimensional virtual object. In some implementations, the scaled version may be scaled from the first virtual feature toward the second virtual feature. Scaling can be carried out by device 104, device 108, or other device cable of modifying virtual content in the VR space in response to receiving movement input.

In some implementations, detecting the first interaction pattern may include detecting a first input associated with a first tracked device and detecting the second interaction pattern includes detecting a second input associated with a second tracked device. In particular, the first tracked device may be controller 112 while the second tracked device may be controller 114.

At block 606, the system 100 can detect a second interaction pattern such as a second hand or controller-based grasp onto the virtual object. The second interaction pattern may include an orientation and movement corresponding to a modification to be performed on a second virtual feature associated with the three-dimensional virtual object. For example, the second interaction pattern may include grasping the virtual object at a second location and the pattern may be a twist, a rotation, a pulling, a pushing, or other object-manipulating movement. Similar devices or user body parts can be used to perform the second interaction pattern.

In response to detecting the second interaction pattern, the system 100, at block 608 can generate a modified version of the three-dimensional virtual object at the first virtual feature according to the first interaction pattern and at the second virtual feature according to the second interaction pattern. For example, the system 100 can carry out the user received interactions based on grasp locations, object details, etc.

At block 610, the system 100 can provide in the user interface in the head mounted display device, the modified version of the three-dimensional virtual object. In some implementations, the modified version of the three-dimensional virtual object is generated and rendered in the virtual environment while the movement occurs. In some implementations, the modified version of the three-dimensional virtual object is adjusted from the first virtual feature to a new position, orientation, and scale of the three-dimensional virtual object and adjusted from the second virtual feature to a new position, orientation, and scale of the three-dimension virtual object. The modified version may be displayed within a user field of view in the virtual environment. In general, the modifications can be carried out by VR system 108 within VR application 110 base on detected input from other hardware interfaced to system 108 and/or application 110.

In some implementations, generating a modified version of the three-dimensional virtual object at the first virtual feature according to the first interaction pattern and at the second virtual feature according to the second interaction pattern may include stretching and twisting the three-dimensional virtual object. For example, the stretching include defining a first anchor point and a second anchor point on the three-dimensional virtual object and stretching in a plane formed between the first anchor point and the second anchor point. In some implementations, twisting the three-dimensional virtual object includes rotating the three-dimensional virtual object in 3D space at the first virtual feature in a first input plane and rotating the three-dimensional virtual object includes rotating the three-dimensional virtual object in 3D space at the second virtual feature from a second input plane to a third input plane. In general, the first input plane may correspond to an x-y coordinate plane, the second input plane may correspond to a y-z coordinate plane, and the third input plane may correspond to an x-z coordinate plane. Each plane may be a three-dimensional coordinate space.

In some implementations, the process 600 may include generating a first intersection point at the first virtual feature based at least in part on detecting a first tracked hand movement performed by a left hand of the user accessing the virtual environment. For example, if the user reaches with his left hand to grasp a virtual object in the VR space, the system 100 can determine an intersection of the hand and the virtual object and can generate an intersection point. The intersection point may be shown, or otherwise indicated (e.g., audio feedback, tactile feedback, etc.) on the virtual object. In some implementations, the intersection point is calculated for use in other calculations and operations that the user may perform on the virtual object. Similarly, the system 100 can generate a second intersection point at a second virtual feature, based at least in part on detecting a second tracked hand movement performed by a right hand of the user accessing a VR space. For example, the second tracked hand movement may pertain to the user grasping the same virtual object that his left hand is grasping. After both intersection points are generated, the system 100 can modify the three-dimensional virtual object according to the first and second interaction patterns. The modifications may be being based at least in part on determining that at least one gesture performed in the first or second tracked hand movement is a change in orientation associated with the three-dimensional virtual object. The system 100 can then perform the at least one gesture while modifying the three-dimensional object according to another gesture. For example, the system 100 can execute a rotational change on the virtual object while also changing the location, size, and/or shape of the virtual object, in the event that the user input (e.g., hand motions, gestures, controller gestures) indicates to do so.

In some implementations, process 600 can include generating an anchor point configured to freeze, in three-dimensional space, a portion of the three-dimensional virtual object, at the first intersection point while modifying the three-dimensional object at the second virtual feature according to the second interaction pattern. For example, the system 100 can freeze or isolate a portion of the virtual object in order to affix the object at the portion while changing other portions of the object. The changes can pertain to shape, scale, orientation, for example. This feature can function to hold a portion of the virtual object in place while the user interacts with one or both hands to carry out other visual changes or effects on the object.

In some implementations, generating an anchor point includes defining at least one location on the three-dimensional virtual object as a selectable scaling location. The selectable scaling location may be operable to receive a user-initiated input, that includes at least one gesture indicating instructions for scaling the three-dimensional virtual object.

In some implementations, the process 600 may include enabling a uniform scaling mode in response to detecting that the first interaction pattern is performed in the same axis of the three dimensions as the second interaction pattern. The uniform scaling mode may be configured to scale the three-dimensional virtual object evenly in three dimensions according to the first and second interaction patterns.

Figure 7:
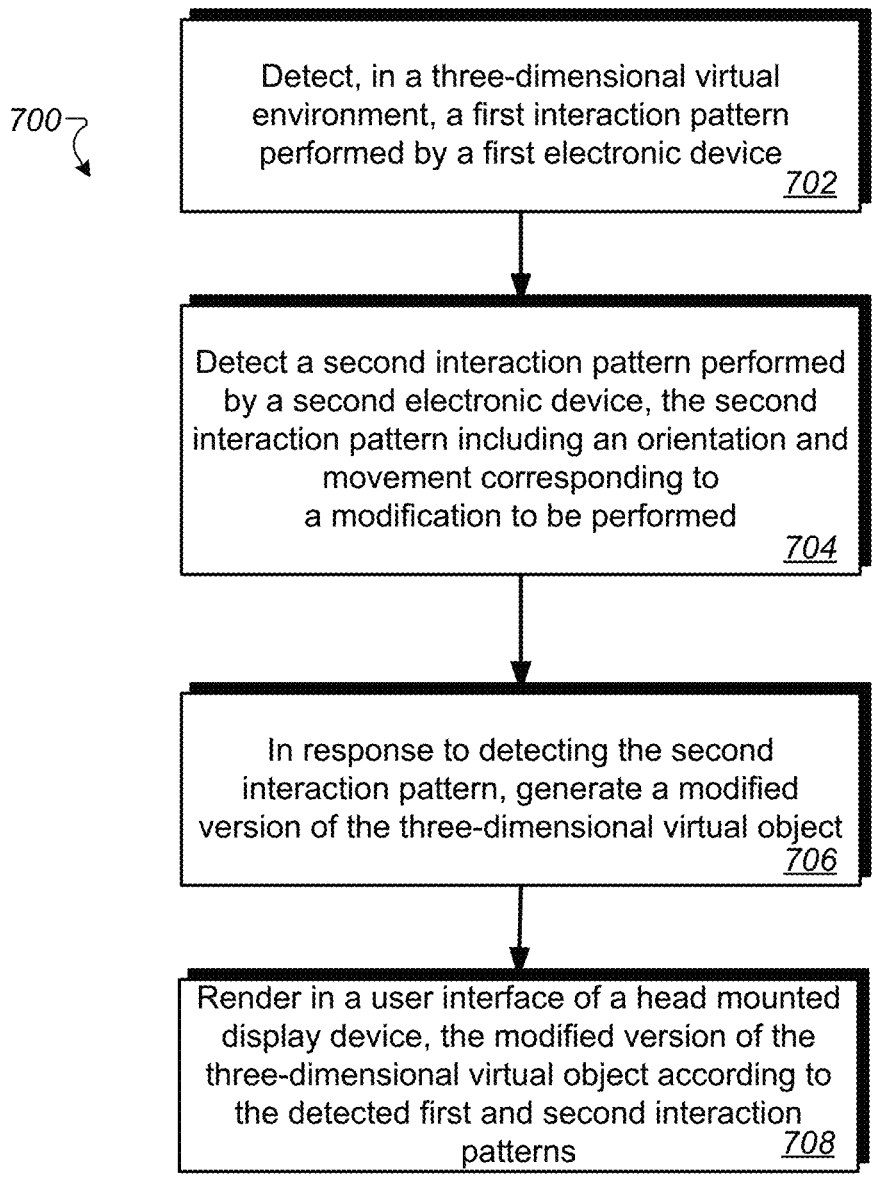
FIG. 7 is a flow chart diagramming one embodiment of another process to modify 3D image content in a VR space.

FIG. 7 is a flow chart diagramming one embodiment of a process 700 to modify 3D image content in a VR space. At block 702, the system 100 can detect, in a three-dimensional virtual environment, a first interaction pattern performed by a first electronic device. The electronic device may be, for example, a controller, or a mobile device, and the like. The first interaction pattern may include an indication to modify a first virtual feature associated with a three-dimensional virtual object rendered in the virtual environment. The virtual feature may pertain to any or all portions of the virtual object and/or portions of the environment surrounding the virtual object. Similar to process 600, devices may pertain to controllers 112 or 114, mobile device 102 or other detectable and trackable device configured for use in a VR space.

At block 704, the process 700 can detect, in the three-dimensional virtual environment, a second interaction pattern performed by a second electronic device. The second electronic device may be a similar or different device type than the first electronic device. The second interaction pattern may include an orientation and movement corresponding to a modification to be performed on a second virtual feature associated with the three-dimensional virtual object. For example, the second interaction pattern may be a twist and tilt, a swivel, a full circle, a panning around, or other gesture performable by a user wielding an electronic device.

In response to detecting the second interaction pattern, the process 700 can include, at block 706, generating a modified version of the three-dimensional virtual object at the first virtual feature according to the first interaction pattern and at the second virtual feature according to the second interaction pattern. For example, system 100 can carry out one or more gestures on the virtual object in order to generate the modified version of the object.

At block 708, the system 100 can render, in a user interface of a head mounted display device, the modified version of the three-dimensional virtual object according to the detected first interaction pattern and the detected second interaction pattern. The rendering can be performed as the modifications are performed on the object. Accordingly, the user can view his input as the modifications to the virtual device are carried out based on interaction pattern movements made by hands (controllers).

In some implementations, the process 700 may include enabling a uniform scaling mode in response to detecting that the first electronic device is oriented to face the second electronic device. For example, system 100 can detect that any of the tracked controllers, hands, fingers, thumbs are aligned to trigger the uniform scaling mode. Such a mode may be a scaling mode configured to scale the three-dimensional virtual object evenly in three dimensions according to the detected first interaction pattern and the detected second interaction pattern. In some implementations, all six degrees of freedom may be enabled with this feature.

In general, detecting that the first electronic device is oriented to face the second electronic device may include detecting an initial position and orientation of the second electronic device relative to the first electronic device, tracking at least one gesture performed by the second electronic device relative to the first electronic device, and detecting an alignment of the second electronic device to the first electronic device. Detecting the alignment may include performing a comparison of the initial position and orientation of the second electronic device relative to the first electronic device with a detected updated position and orientation of the first or the second electronic device. The detected updated position may be based on the at least one gesture.

In some implementations, generating a modified version of the three-dimensional virtual object at the first virtual feature includes providing a visual indication, in the virtual environment and affixed to the three-dimensional virtual object. The visual indication may include one or more anchor points defining snapping frames. The snapping frames may be configured to select at least one coordinate system in which to translate and rotate the virtual object in three dimensions.

In some implementations, the process 700 can include defining a rotation path to rotate the three-dimensional virtual object around a location associated with the first virtual feature in response to detecting the second interaction pattern. For example, system 100 can track and detect a rotational movement indicated by the second interaction pattern and can define a path in which to rotate the virtual object. Such a path may be visually indicated or simply affixed to the virtual object as a property that can be illustrated should the user perform a particular rotational gesture.

Figure 8:
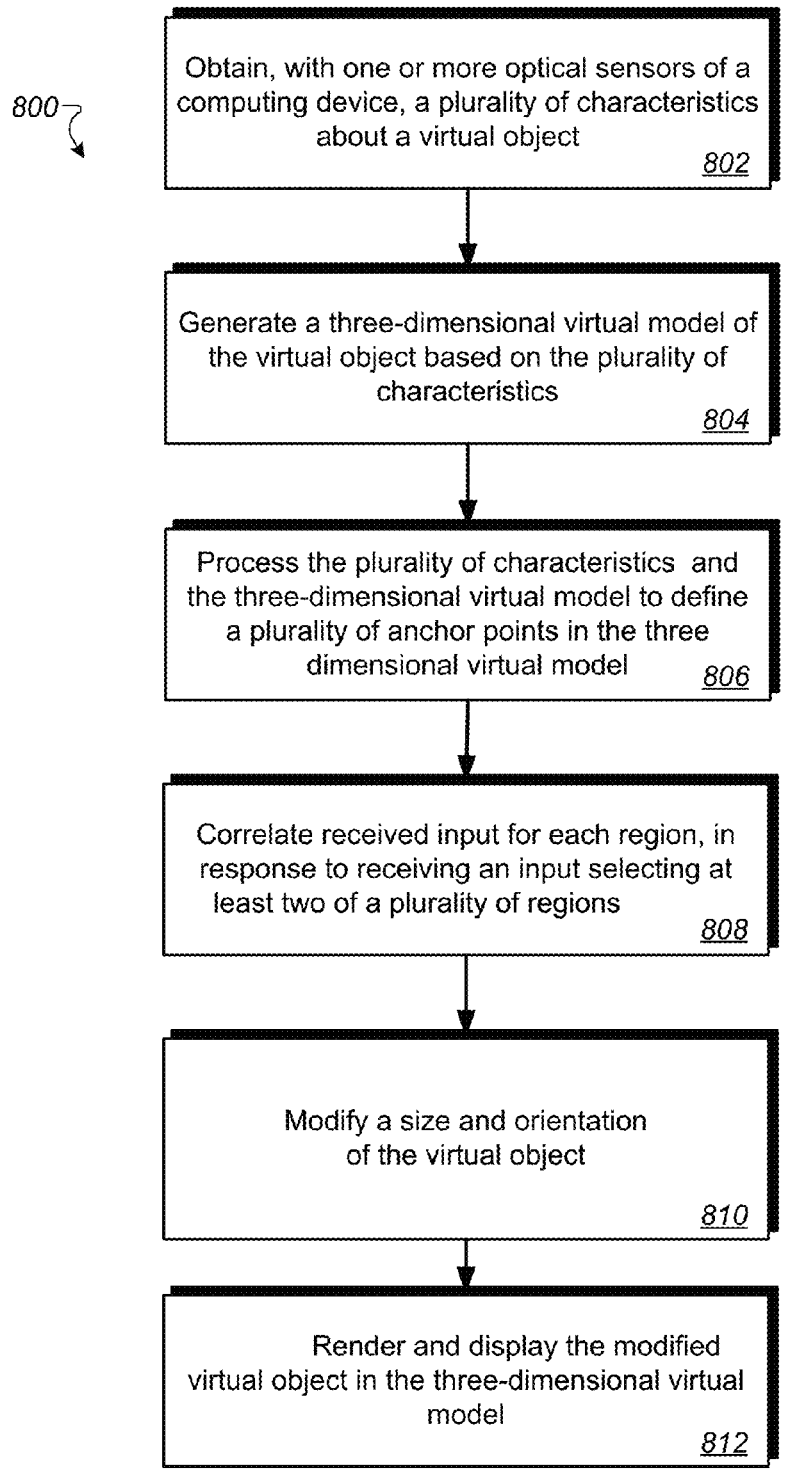
FIG. 8 is a flow chart diagramming one embodiment of a process to generate a model of a virtual object.

FIG. 8 is a flow chart diagramming one embodiment of a process 800 to generate a model of a virtual object. At block 802, the process 800 can include obtaining, with one or more optical sensors of a computing device, feature information about a virtual object. For example, the system 100 can obtain features/characteristics associated with the virtual object include one or more of a planarity, a dimension, an area, an orientation, a corner, a boundary, a contour or a surface texture for the virtual object.

At block 804, the process 800 includes generating, by a processor of the computing device, a three-dimensional virtual model of the virtual object based on the plurality of characteristics. The virtual model may be defined to define the virtual object, but can also be defined in terms of interpretation of determining how to modify the object according to possible user input/gestures. The three-dimensional virtual model can be generated by VR system 108 and VR application 110.

At block 806, the process 800 includes processing, by the processor, the plurality of characteristics and the three-dimensional virtual model to define a plurality of anchor points in the three-dimensional virtual model. The plurality of anchor points may be respectively associated with a plurality of selectable regions on the virtual object. As described in detail above, anchor points may pertain to selectable portions of the virtual object, connectable portions of the virtual object, and or definitions as to planes of movement.

At block 808, the process 800 includes correlating the input for each region in the plurality of regions, in response to receiving an input selecting at least two of the plurality of regions. The correlation of the at least two inputs can be used to properly modify the virtual object. The VR system 108 may access any number of servers and/or processors to perform calculations for correlating particular input to particular regions.

At block 810, the process 800 includes modifying a size and orientation of the virtual object, based on the correlation and on the plurality of characteristics associated with the virtual object. At block 812, the process 800 includes rendering and displaying a modified virtual object in the three-dimensional virtual model. In some implementations, the process 800 can include generating a virtual reality environment including the three dimensional virtual model of the virtual object in the virtual reality environment.

In some implementations, the process 800 may include automatically scaling the virtual object while rotating the virtual object in three dimensions in the generated virtual reality environment based on a two-hand interaction performed by a user and detected plurality of characteristics associated with the virtual object. Such automatic scaling during rotation can be provided using calculated vectors, as described in detail above.

Figure 9:
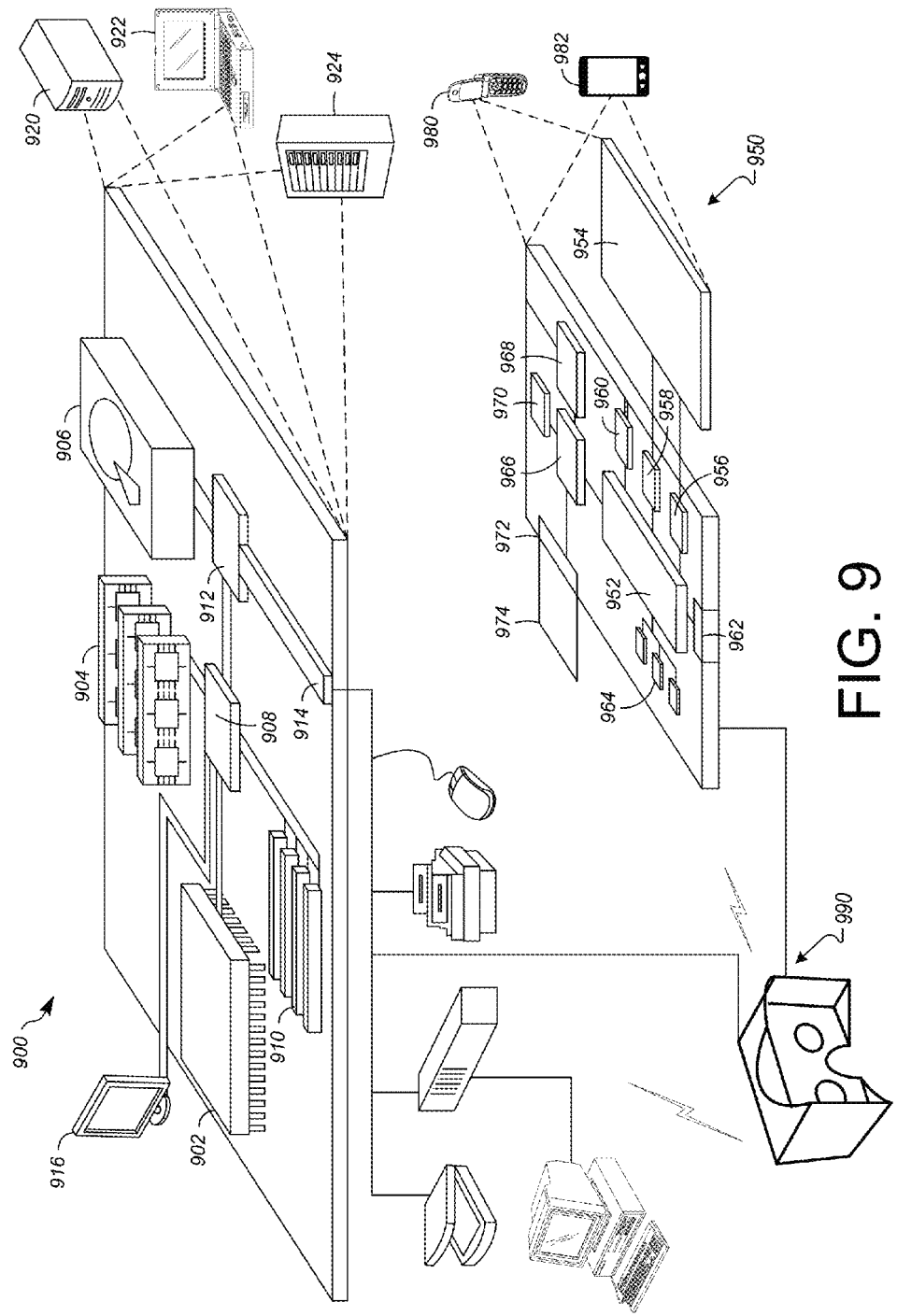
FIG. 9 shows an example of a computer device and a mobile computer device that can be used to implement the techniques described herein.

FIG. 9 shows an example of a generic computer device 900 and a generic mobile computer device 950, which may be used with the techniques described here. Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. In addition, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 9 can include sensors that interface with a virtual reality (VR headset 990). For example, one or more sensors included on a computing device 950 or other computing device depicted in FIG. 9, can provide input to VR headset 990 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 950 can use the sensors to determine an absolute position and/or a detected rotation of the computing device in the VR space that can then be used as input to the VR space. For example, the computing device 950 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 950 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 950 when the computing device is incorporated into the VR space can cause a particular action to occur in the VR space.

In some implementations, a touchscreen of the computing device 950 can be rendered as a touchpad in VR space. A user can interact with the touchscreen of the computing device 950. The interactions are rendered, in VR headset 990 for example, as movements on the rendered touchpad in the VR space. The rendered movements can control objects in the VR space.

In some implementations, one or more output devices included on the computing device 950 can provide output and/or feedback to a user of the VR headset 990 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 950 may appear as another object in a computer-generated, 3D environment. Interactions by the user with the computing device 950 (e.g., rotating, shaking, touching a touchscreen, swiping a finger across a touch screen) can be interpreted as interactions with the object in the VR space. In the example of the laser pointer in a VR space, the computing device 950 appears as a virtual laser pointer in the computer-generated, 3D environment. As the user manipulates the computing device 950, the user in the VR space sees movement of the laser pointer. The user receives feedback from interactions with the computing device 950 in the VR space on the computing device 950 or on the VR headset 990.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

In some implementations, the systems depicted throughout this disclosure may include at least one computing device configured to generate a virtual environment. The at least one computing device may include a memory storing executable instructions and a processor configured to execute the instructions, to cause the at least one computing device to perform a number of steps. The steps may include, among other things, generating a virtual environment including at least one three-dimensional virtual object within a user interface provided in a head mounted display device. Inputs may be detected based on user interactions. For example, the at least one computing device may detect a first interaction pattern and/or a second interaction pattern. The first interaction pattern may include an indication to modify a first virtual feature associated with the three-dimensional virtual object. The second interaction pattern may include an orientation and movement corresponding to a modification to be performed on a second virtual feature associated with the three-dimensional virtual object. In response to detecting the second interaction pattern, the computing device may generate a modified version of the three-dimensional virtual object at the first virtual feature according to the first interaction pattern and at the second virtual feature according to the second interaction pattern. Such modified versions of virtual objects can be provided in the user interface in the head mounted display device. In some implementations, the modified versions of the three-dimensional virtual object may be generated and rendered in the virtual environment while the movement is occurring (e.g., in real time). In some implementations, the first interaction pattern defines a location in which to begin modifying the first virtual feature while the second interaction pattern defines a direction and orientation away from the second virtual feature.

Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
generating a virtual environment including at least one three-dimensional virtual object within a user interface generated for a head mounted display device;
detecting a first interaction pattern, the first interaction pattern including an input selecting at least two locations on the three-dimensional virtual object in which to begin modifying at least one virtual feature associated with the three-dimensional virtual object;
triggering display of at least one visual indication in the user interface while continuing to depict the three-dimensional virtual object, the at least one visual indication depicting a way in which the three-dimensional virtual object is visually modifiable using the at least two selected locations;
in response to detecting a second interaction pattern including an orientation and movement corresponding to a modification to be performed, according to the visual indication and on the at least one virtual feature associated with the three-dimensional virtual object, generating a modified version of the three-dimensional virtual object according to the first interaction pattern and the second interaction pattern; and
providing, in the user interface in the head mounted display device, the modified version of the three-dimensional virtual object.

2. The method of claim 1, wherein the modified version of the three-dimensional virtual object is generated for the virtual environment while the movement corresponding to the second interaction pattern occurs.

3. The method of claim 1, wherein the second interaction pattern defines a direction and orientation away from the virtual feature, and the modified version of the three-dimensional virtual object includes a scaled version of the three-dimensional virtual object, the scaled version being scaled from the virtual feature.

4. The method of claim 1, wherein the modified version of the three-dimensional virtual object is adjusted from the virtual feature to an updated position, orientation, and scale of the three-dimensional virtual object, the modified version being within a user field of view in the virtual environment.

5. The method of claim 1, further comprising:
enabling a uniform scaling mode in response to detecting that the first interaction pattern is performed in the same axis of the three dimensions as the second interaction pattern, wherein the uniform scaling mode is configured to scale the three-dimensional virtual object evenly in three dimensions according to the first interaction pattern and the second interaction pattern.

6. The method of claim 1, wherein generating a modified version of the three-dimensional virtual object at the virtual feature according to the first interaction pattern and the second interaction pattern includes stretching and twisting the three-dimensional virtual object, the stretching including defining a first anchor point and a second anchor point on the three-dimensional virtual object and stretching in a plane formed between the first anchor point and the second anchor point.

7. The method of claim 6, wherein twisting the three-dimensional virtual object includes rotating the three-dimensional virtual object in three-dimensional space at a first location of the at least two locations in a first input plane and rotating the three-dimensional virtual object in three-dimensional space at a second location of the at least two locations from a second input plane to a third input plane, wherein the first input plane corresponds to an X-Y coordinate plane, the second input plane corresponds to a Y-Z coordinate plane, and the third input plane corresponds to an X-Z coordinate plane, each plane being of a three-dimensional coordinate space.

8. The method of claim 1, wherein detecting the first interaction pattern includes detecting a first location of the at least two locations associated with a first tracked device and detecting the second interaction pattern includes detecting a second location of the at least two locations associated with a second tracked device.

9. The method of claim 1, further comprising:
generating a first intersection point at a first location of the at least two selected locations based at least in part on detecting a first tracked hand movement performed by a left hand of a user accessing the virtual environment;
generating a second intersection point at a second location of the at least two selected locations based at least in part on detecting a second tracked hand movement performed by a right hand of the user accessing the virtual environment; and
modifying the three-dimensional virtual object according to the first interaction pattern and the second interaction pattern, the modifying being based at least in part on determining that at least one gesture performed in the first tracked hand movement or the second tracked hand movement is a change in orientation associated with the three-dimensional virtual object, and performing the at least one gesture while modifying the three-dimensional object according to an additional received gesture.

10. The method of claim 9, further comprising:
generating an anchor point configured to freeze, in three-dimensional space, a portion of the three-dimensional virtual object, at the first intersection point while modifying the three-dimensional object at the virtual feature according to the second interaction pattern.

11. The method of claim 10, wherein generating an anchor point comprises defining at least one location of the at least two selected locations on the three-dimensional virtual object as a selectable scaling location, the selectable scaling location being operable to receive a user-initiated input, the user-initiated input including at least one gesture indicating a direction for scaling the three-dimensional virtual object.

12. A computer-implemented method comprising:
detecting, in a three-dimensional virtual environment, a first interaction pattern performed by a first electronic device and on a three-dimensional virtual object rendered in the virtual environment, the first interaction pattern including an input selecting at least two locations on the three-dimensional virtual object in which to begin modifying at least one virtual feature associated with the three-dimensional virtual object;
triggering display of at least one visual indication while continuing to depict the three-dimensional virtual object, the at least one visual indication depicting a way in which the three-dimensional virtual object is modifiable using the at least two selected locations;
in response to detecting a second interaction pattern, the second interaction pattern including an orientation and movement corresponding to a modification to be performed, according to the visual indication, on the at least one virtual feature associated with the three-dimensional virtual object, generating a modified version of the three-dimensional virtual object according to the first interaction pattern and the second interaction pattern; and generating, in a user interface, the modified version of the three-dimensional virtual object according to the first interaction pattern and the second interaction pattern.

13. The method of claim 12, further comprising, enabling a uniform scaling mode in response to detecting that the input is associated with a first electronic device oriented to face a second electronic device, wherein the uniform scaling mode is configured to scale the three-dimensional virtual object evenly in three dimensions according to the first interaction pattern and the second interaction pattern.

14. The method of claim 13, wherein detecting that the first electronic device is oriented to face the second electronic device includes:
detecting an initial position and orientation of the second electronic device relative to the first electronic device;
tracking at least one gesture performed by the second electronic device relative to the first electronic device; and
detecting an alignment of the second electronic device to the first electronic device by comparing the initial position and orientation of the second electronic device relative to the first electronic device with a detected updated position and orientation of the first or the second electronic device, the detected updated position being based on the at least one gesture.

15. The method of claim 12, wherein generating a modified version of the three-dimensional virtual object includes providing the visual indication, in the virtual environment and affixed to the three-dimensional virtual object, the visual indication including a plurality of anchor points defining snapping frames configured to select at least one coordinate system in which to translate and rotate the virtual object in three dimensions, wherein at least two of the plurality of anchor points correspond to the at least two selected locations.

16. The method of claim 12, further comprising, in response to detecting the second interaction pattern, defining a rotation path to rotate the three-dimensional virtual object around a location associated with the virtual feature.

17. A system, comprising:
at least one computing device configured to generate a virtual environment, the at least one computing device including,
a memory storing executable instructions; and
a processor configured to execute the instructions, to cause the at least one computing device to:
generate a virtual environment including at least one three-dimensional virtual object within a user interface generated for a head mounted display device;
detect a first interaction pattern, the first interaction pattern including an input selecting at least two locations on the three-dimensional virtual object in which to begin modifying at least one virtual feature associated with the three-dimensional virtual object;
trigger display of at least one visual indication in the user interface while continuing to depict the three-dimensional virtual object, the at least one visual indication depicting a way in which the three-dimensional virtual object is visually modifiable using the at least two selected locations;
in response to detecting a second interaction pattern including an orientation and movement corresponding to a modification to be performed according to the visual indication and on the at least one virtual feature associated with the three-dimensional virtual object, generating a modified version of the three-dimensional virtual object according to the first interaction pattern and the second interaction pattern; and
provide, in the user interface in the head mounted display device, the modified version of the three-dimensional virtual object.

18. The system of claim 17, wherein the modified version of the three-dimensional virtual object is generated and rendered in the virtual environment while the movement corresponding to the second interaction pattern occurs.

19. The system of claim 17, wherein the second interaction pattern defines a direction and orientation away from the virtual feature, and the modified version of the three-dimensional virtual object includes a scaled version of the three-dimensional virtual object, the scaled version being scaled from the virtual feature.

20. The system of claim 17, wherein the modified version of the three-dimensional virtual object is adjusted from the virtual feature to an updated position, orientation, and scale of the three-dimensional virtual object, the modified version being within a user field of view in the virtual environment.

21. The system of claim 17, further comprising:
enabling a uniform scaling mode in response to detecting that the first interaction pattern is performed in the same axis of the three dimensions as the second interaction pattern, wherein the uniform scaling mode is configured to scale the three-dimensional virtual object evenly in three dimensions according to the first interaction pattern and the second interaction pattern.

22. A method, comprising:
obtaining, with one or more optical sensors of a computing device, a plurality of characteristics about a virtual object;
generating, by a processor of the computing device, a three-dimensional virtual model of the virtual object based on the plurality of characteristics;
processing, by the processor, the plurality of characteristics and the three-dimensional virtual model to generate a plurality of anchor points in the three-dimensional virtual model, the plurality of anchor points defining a plurality of selectable regions on the virtual object, the anchor points being associated with predefined rules for triggering a plurality of visual modifications of the virtual object;
in response to receiving input selecting at least two of the plurality of selectable regions, triggering display of at least one visual indication including an illustration depicting a way in which the virtual object is modifiable responsive to the at least two selected regions corresponding to the input and according to at least one of the predefined rules; and
in response to receiving additional movement while maintaining the selection of the at least two selectable regions, modifying a size and orientation of the virtual object according to the illustration and based on the additional movement and on the plurality of characteristics associated with the virtual object.

23. The method of claim 22, wherein the plurality of characteristics associated with the virtual object include one or more of a planarity, a dimension, an area, an orientation, a corner, a boundary, a contour or a surface texture for the virtual object.

24. The method of claim 22, further comprising:
generating a virtual reality environment including the three dimensional virtual model of the of the virtual object in the virtual reality environment; and automatically scaling the virtual object while rotating the virtual object in three dimensions in the generated virtual reality environment based on a two-hand interaction performed by a user to select the at least two locations and based on detected characteristics associated with the virtual object.

\* \* \* \* \*